United States Patent
Tanaka et al.

(10) Patent No.: US 12,387,638 B2
(45) Date of Patent: Aug. 12, 2025

(54) DISPLAY DEVICE FOR ENABLING A USER TO VISUALLY RECOGNIZE AN IMAGE AS A VIRTUAL IMAGE

(71) Applicant: Panasonic Intellectual Property Management Co., Ltd., Osaka (JP)

(72) Inventors: Akira Tanaka, Osaka (JP); Toshiya Mori, Osaka (JP); Tadashi Shibata, Osaka (JP); Fumihito Inukai, Kyoto (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 180 days.

(21) Appl. No.: 18/108,991

(22) Filed: Feb. 13, 2023

(65) Prior Publication Data

US 2023/0196953 A1 Jun. 22, 2023

Related U.S. Application Data

(63) Continuation of application No. PCT/JP2021/031521, filed on Aug. 27, 2021.

(30) Foreign Application Priority Data

Aug. 31, 2020 (JP) .................................. 2020-146228

(51) Int. Cl.
*G09G 3/00* (2006.01)
*B60K 35/00* (2024.01)
(Continued)

(52) U.S. Cl.
CPC ............. *G09G 3/002* (2013.01); *B60K 35/00* (2013.01); *B60K 35/10* (2024.01); *G09B 29/00* (2013.01);
(Continued)

(58) Field of Classification Search
None
See application file for complete search history.

(56) References Cited

U.S. PATENT DOCUMENTS

2009/0005961 A1 1/2009 Grabowski et al.
2010/0164702 A1* 7/2010 Sasaki .................... G02B 27/01
345/7
(Continued)

FOREIGN PATENT DOCUMENTS

JP 2006-284458 A 10/2006
JP 2008-501956 A 1/2008
(Continued)

OTHER PUBLICATIONS

International Search Report issued in International Bureau of WIPO Patent Application No. PCT/JP2021/031521, dated Nov. 9, 2021, along with an English translation thereof.
(Continued)

*Primary Examiner* — Michael J Cobb
(74) *Attorney, Agent, or Firm* — GREENBLUM & BERNSTEIN, P.L.C.

(57) ABSTRACT

A display device includes a controller that determines the mode of inclination of a display object that is an image shaped to point to one direction, and a drawing unit that projects light representing the display object in the mode of inclination determined by the controller onto a windshield to cause the light to be reflected off the windshield toward a user in the vehicle to enable the user to visually recognize the display object in the mode of inclination as a virtual image through the windshield. The controller determines the mode of inclination of the display object that points to the one direction as a navigation direction, by controlling yaw
(Continued)

and roll angles of the display object depending on the attribute of a path point that is set on the path to navigate the vehicle to a destination.

16 Claims, 15 Drawing Sheets

(51) Int. Cl.
   *B60K 35/10* (2024.01)
   *B60K 35/23* (2024.01)
   *B60K 35/28* (2024.01)
   *G09B 29/00* (2006.01)
   *G09B 29/10* (2006.01)
   *G09G 5/00* (2006.01)
(52) U.S. Cl.
   CPC ............. *G09B 29/10* (2013.01); *G09G 5/003* (2013.01); *B60K 35/23* (2024.01); *B60K 35/28* (2024.01); *B60K 2360/166* (2024.01); *B60K 2360/23* (2024.01); *B60K 2360/334* (2024.01); *G09G 2340/0478* (2013.01); *G09G 2340/0492* (2013.01); *G09G 2380/10* (2013.01)

(56) References Cited

U.S. PATENT DOCUMENTS

| | | | |
|---|---|---|---|
| 2012/0050138 A1* | 3/2012 | Sato | G02B 27/01 345/4 |
| 2014/0362195 A1 | 12/2014 | Ng-Thow-Hing et al. | |
| 2015/0260540 A1* | 9/2015 | Ishikawa | G01C 21/3647 701/436 |
| 2016/0327402 A1 | 11/2016 | Funabiki et al. | |
| 2019/0084419 A1* | 3/2019 | Suzuki | G09G 3/03 |
| 2019/0204103 A1 | 7/2019 | Kimura | |
| 2020/0355930 A1* | 11/2020 | Kasazumi | B60K 35/81 |
| 2024/0034319 A1* | 2/2024 | Umezawa | B60W 60/001 |

FOREIGN PATENT DOCUMENTS

| | | |
|---|---|---|
| JP | 2009-244355 A | 10/2009 |
| JP | 2009-250827 A | 10/2009 |
| JP | 2010-156608 A | 7/2010 |
| JP | 2015-068831 A | 4/2015 |
| JP | 2017-021019 A | 1/2017 |
| JP | 2017-173125 A | 9/2017 |
| JP | 2019-119318 A | 7/2019 |
| WO | 2005/121707 A2 | 12/2005 |
| WO | 2009/119008 A1 | 10/2009 |
| WO | 2015/118859 A2 | 8/2015 |

OTHER PUBLICATIONS

Office Action mailed on May 28, 2024 for related Japanese patent application No. 2020-146228, together with an English translation thereof.

Office Action mailed on Feb. 6, 2024 for related Japanese patent application No. 2020-146228, together with an English translation thereof.

* cited by examiner

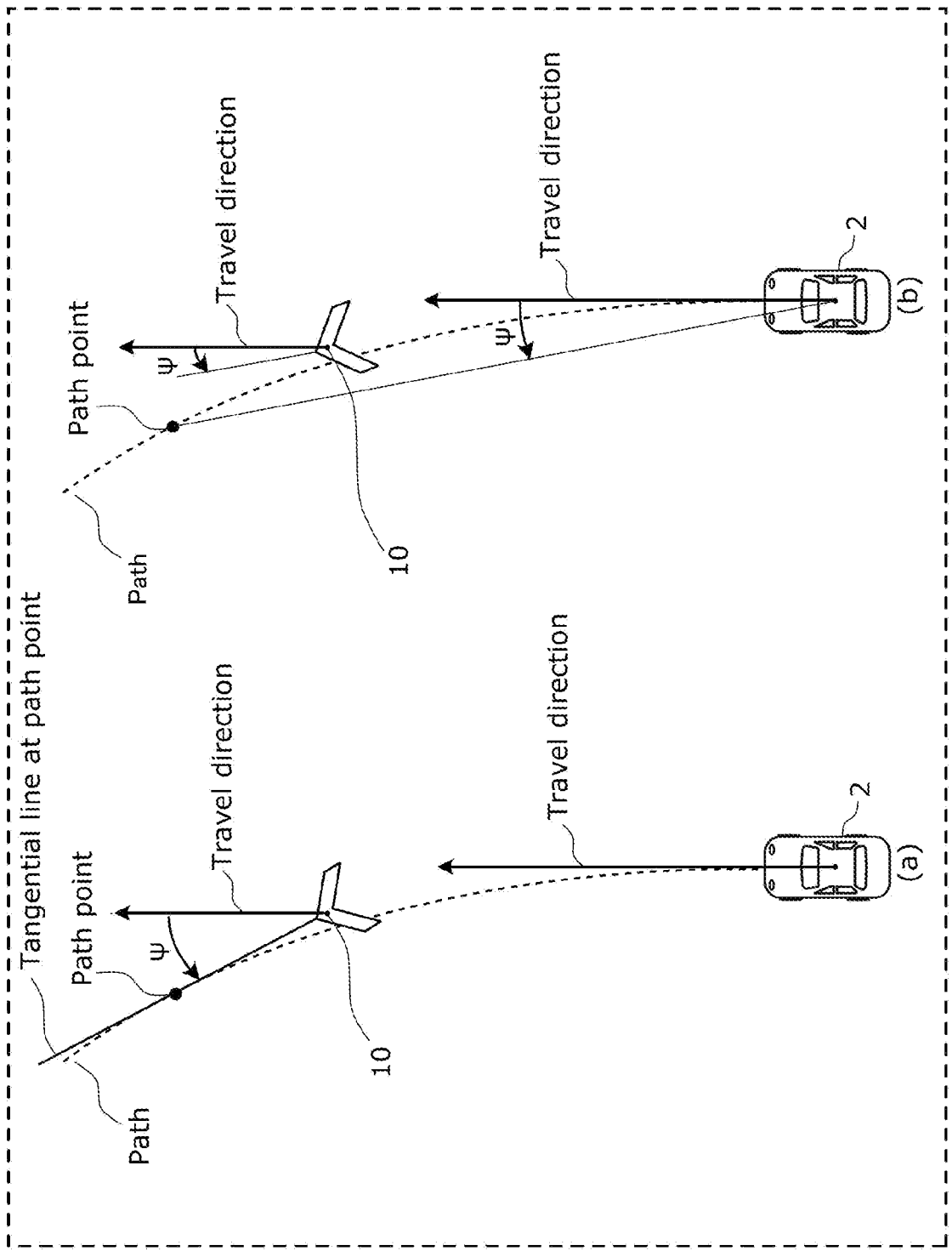

(a)    (b)

DISPLAY DEVICE FOR ENABLING A USER TO VISUALLY RECOGNIZE AN IMAGE AS A VIRTUAL IMAGE

CROSS REFERENCE TO RELATED APPLICATIONS

This is a continuation application of PCT International Application No. PCT/JP2021/031521 filed on Aug. 27, 2021, designating the United States of America, which is based on and claims priority of Japanese Patent Application No. 2020-146228 filed on Aug. 31, 2020.

FIELD

The present disclosure relates to a display device for enabling a user to visually recognize an image as a virtual image.

BACKGROUND

Display devices have conventionally been proposed in which light representing an image is projected onto and reflected off a translucent plate-like display medium while showing a background through the display medium to a user so as to enable the user to visually recognize the image as a virtual image. Such display devices use so-called augmented reality (AR) and are capable of displaying, in a real background, an image related to the background. In particular, in fields such as automobile-related fields, so-called head-up displays (HUDs) have been developed that display an image indicating speed or various types of warnings as a virtual image in front of a windshield during driving (see, for example, Patent Literature (PTL) 1).

The use of such a display device enables a driver as the user to see driving-related images (e.g., a map, a speed meter, or a navigation direction), i.e., display objects, without large eye movements while seeing the outside world ahead. The driver is thus able to drive more carefully.

CITATION LIST

Patent Literature

PTL 1: International Publication No. 2015/118859

SUMMARY

However, the display device which is the head-up display of the above PTL 1 can be improved upon.

In view of this, the present disclosure provides a display device capable of improving upon the above related art.

A display device according to one aspect of the present disclosure includes a control circuit that determines a mode of inclination of a display object that is an image shaped to point to one direction; and a projector that projects light representing the display object in the mode of inclination determined by the control circuit onto a display medium provided in a vehicle, to cause the light to be reflected off the display medium toward a user in the vehicle to enable the user to visually recognize the display object in the mode of inclination as a virtual image through the display medium. The control circuit determines the mode of inclination of the display object that points to the one direction as a navigation direction, by controlling a yaw angle and a roll angle of the display object in accordance with an attribute of a path point that is set on a path for navigation of the vehicle to a destination.

Note that these general and specific aspects may be achieved by a system, a method, an integrated circuit, a computer program, or a computer-readable recording medium such as a CD-ROM, or may be achieved by any combination of a system, a method, an integrated circuit, a computer program, and a computer-readable recording medium. The recording medium as referred to herein may be a non-transitory recording medium.

The display device according to one aspect of the present disclosure is capable of improving upon the above related art.

Further advantages and effects of one aspect of the present disclosure become apparent from the specification and the drawings. These advantages and/or effects are each implemented by features described in some embodiments and in the specification and drawings, but not all of them have to be implemented necessarily in order to achieve one or more of the same features.

BRIEF DESCRIPTION OF DRAWINGS

FIG. 9A is a diagram showing one example of controlling the yaw angle of a display object according to the embodiment.

Figure 1:
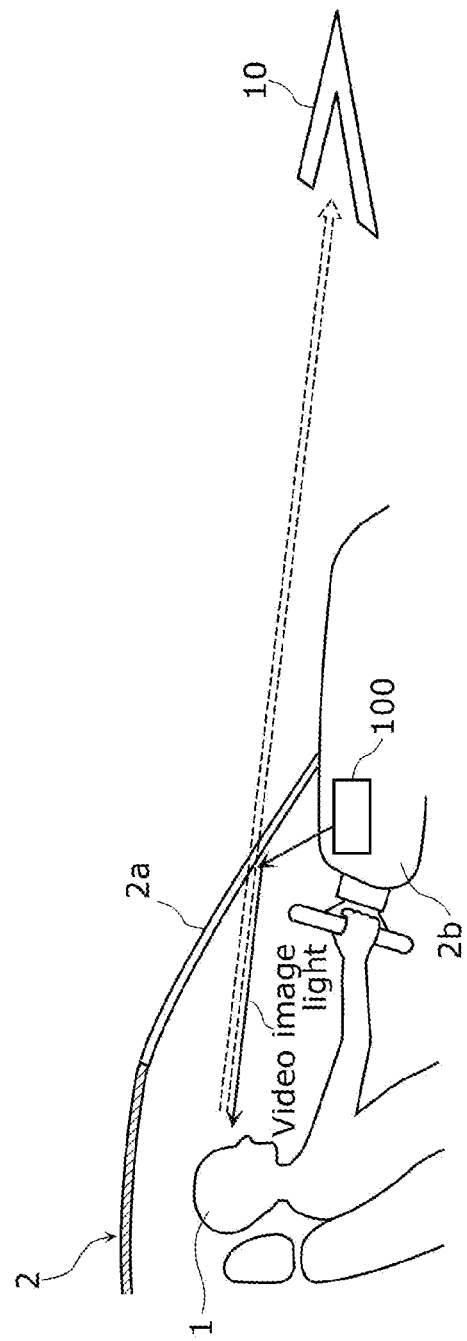
FIG. 1 is a diagram showing an example of use of a display device according to an embodiment.

DESCRIPTION OF EMBODIMENT (Underlying Knowledge Forming Basis of the Present Disclosure)

The inventors of the present disclosure have found the following possible problems with the display device according to PTL 1 described in the "Background Art".

The display device according to PTL 1 displays guidance for vehicle navigation. That is, the display device overlays a display object such as an arrow on a road surface. The displayed guidance is expressed as AR, and the display object displayed as guidance may have, for example, a long carpet-like shape.

The display object displayed as guidance may, however, extend off a driving lane when navigation uses a low-precision map or a sensor with low detection accuracy. In other words, overlay misregistration may occur. There is also a possibility that the long display object as a whole may not fit in a display range and may be lost in part. Such overlay misregistration and loss are likely to give a feeling of discomfort to a user. Besides, the feeling of discomfort may mislead the user or the vehicle.

To solve the problems described above, a display device according to one aspect of the present disclosure includes a controller that determines a mode of inclination of a display object that is an image shaped to point to one direction; and a drawing unit that projects light representing the display object in the mode of inclination determined by the controller onto a display medium provided in a vehicle, to cause the light to be reflected off the display medium toward a user in the vehicle to enable the user to visually recognize the display object in the mode of inclination as a virtual image through the display medium. The controller determines the mode of inclination of the display object that points to the one direction as a navigation direction, by controlling a yaw angle and a roll angle of the display object in accordance with an attribute of a path point that is set on a path for navigation of the vehicle to a destination. Please note that the controller may be configured as a control circuit, and the drawing unit may be configured as a projector.

Since the yaw and roll angles of the display object are controlled in accordance with the attribute of the path point, it is possible to display the display object like a bird or plane view to lead the vehicle to the destination. This allows the display object to be formed not into a long carpet-like shape but into a short shape such as an arrowhead pointing to one direction. As a result, it is possible to reduce the occurrence of overlay misregistration or loss of the display object and alleviate user discomfort caused by the overlay misregistration or loss of the display object while appropriately notifying the user of the navigation direction by the one direction pointed to by the display object.

The controller may further control a lateral position of the display object visually recognized in accordance with a direction from the vehicle to the path point, the lateral position being a position in a breadth direction of the vehicle.

This reduces the occurrence of overlay misregistration. The lateral position of the display object is also controlled, for example, such that the direction from the vehicle to the display object is oriented closer to the travel direction of the vehicle than to the direction from the vehicle to the path point. The control reduces the possibility that, even if the display object is displayed within a predetermined range in the lateral position, the display object sticks to the boundary of this range or suddenly moves off this boundary.

The controller may control the lateral position of the display object to allow the display object to be visually recognized within a predetermined range in the breadth direction of the vehicle.

This reduces the possibility that the display object becomes lost or invisible.

The controller may further control a position of the path point in accordance with a travelling speed of the vehicle.

Accordingly, the display object can provide the user with an appropriate navigation direction depending on the travelling speed. For example, in the case where the travelling speed of the vehicle is high, the display object points to a direction to a far path point as the navigation direction. This enables the user who makes a right or left turn at a given intersection to have sufficient lead time to prepare for the right or left turn. In the case where the travelling speed of the vehicle is low, the display object points to a direction to a path point close to the vehicle as the navigation direction. This prevents the display object from pointing to a right or left turn direction when there is another intersection immediately before a target intersection.

When controlling the position of the path point, the controller may determine a first point on the path depending on the travelling speed of the vehicle, when there is a variable section between a current location of the vehicle and the first point and when a difference between a travel direction of the vehicle and a path direction at a second point located immediately before the variable section is outside a predetermined range, the variable section being a section in which an absolute value for a rate of change in the path direction at each point on the path is greater than a threshold value, may determine the second point as the position of the path point; and when the difference falls within the predetermined range, may determine the first point as the position of the path point.

In the case where there is a variable section, either one of the first point and the second point located before and after the variable section is determined as the position of the path point, depending on the travel direction of the vehicle. This reduces the possibility that the display object points to an inappropriate navigation direction as the travel direction of the vehicle.

The controller may further control a depth position of the display object visually recognized in accordance with a travelling speed of the vehicle, the depth position being a position in a travel direction of the vehicle.

This reduces the occurrence of overlay misregistration. Moreover, as the travelling speed of the vehicle becomes higher, a position farther from the vehicle is determined as the depth position, and as the travelling speed of the vehicle becomes lower, a position closer to the vehicle is determined as the depth position. This avoids the display object from being overlaid on a vehicle travelling ahead, for example when the vehicle is travelling slowly on a relatively congested road. The user as a driver tends to focus on a far point when the travelling speed of the vehicle is high, and tends to focus on a near point when the travelling speed of the vehicle is low. This reduces user's eye movements to see the display object and allows the user to drive carefully.

The controller may limit the depth position of the display object to allow the display object to be visually recognized within a predetermined range in an up-down direction of the vehicle.

This reduces the possibility that the display object becomes lost or invisible.

The display device may further include a first input unit that acquires reliability information indicating reliability of the navigation. The controller may control either a height of the display object visually recognized from a road surface or a dynamic design of the display object in accordance with the reliability information acquired by the first input unit.

For example, in the case where the reliability of the navigation is low, overlay misregistration may occur in the display object, or the one direction pointed to by the display object may be shifted from an appropriate navigation direction. However, the display device according to one aspect of the present disclosure controls the height or dynamic design of the display object when the reliability of the navigation is low. As one specific example, the display object may be displayed at apparently a high position, or the display object may blink on and off. This alleviates user discomfort caused by overlay misregistration or the aforementioned shift in the one direction.

The controller may further control a height of the display object visually recognized from a road surface in accordance with a distance from a current location of the vehicle to a right/left turn point on the path.

Accordingly, it is possible to appropriately notify the user of the right/left turn point. Besides, in the case where the height of the display object is controlled to move the display object from a high position to a low position as the vehicle approaches the right/left turn point, it is possible to prompt the user to slow down the vehicle. That is, it is possible to prompt the user to drive carefully.

The attribute of the path point may be a tangential direction at the path point on the path, and when determining the mode of inclination of the display object, the controller may control the yaw angle of the display object to cause the one direction to coincide with the tangential direction. Alternatively, the attribute of the path point may be a position of the path point, and when determining the mode of inclination of the display object, the controller may control the yaw angle of the display object to cause the one direction coincide with a direction from the vehicle to the path point.

Accordingly, the one direction pointed to by the display object is oriented in the tangential direction or in the direction from the vehicle toward the path point. Therefore, it is possible to notify the user of an appropriate navigation direction for directing the vehicle to the path point by the one direction pointed to by the display object.

The controller may further apply an offset to the yaw angle and the roll angle of the display object when a traffic lane different from a driving lane of the vehicle is recommended as a recommended traffic lane in the navigation.

Accordingly, in the case where the one direction pointed to by the display object is oriented to the recommended traffic lane as a result of the application of an offset, it is possible to prompt the user to drive on the recommended traffic lane.

The controller may further change a shape of the display object in accordance with the yaw angle of the display object.

Accordingly, even if the depth position of the display object is far from the vehicle, the visibility of the display object can be improved by changing the shape of the display object.

When determining the mode of inclination of the display object, the controller may further control a pitch angle of the display object in accordance with the yaw angle of the display object.

Accordingly, even if the depth position of the display object is far from the vehicle, the visibility of the display object can be improved by controlling the pitch angle of the display object.

The controller may further control a design of the display object in accordance with a distance from a current location of the vehicle to a right/let turn point located ahead of the path point on the path. Alternatively, the controller may further control a design of the display object in accordance with an expected arrival time from a current location of the vehicle to a right/left turn point located ahead of the path point on the path.

Accordingly, it is possible to notify the user of the navigation direction to the right/left turn point by the mode of inclination of the display object and to appropriately notify the user of the timing of a right or left turn at the right/left turn point by controlling the design of the display object. That is, even if the navigation direction to the right/left turn point is different from the right or left turn direction at the right/left turn point, it is possible to appropriately notify the user of both the navigation direction and the right or left turn direction at the same time.

The controller may further move the display object in the navigation direction when a distance from a current location of the vehicle to a right/left turn point on the path is less than or equal to a threshold value. Alternatively, the controller may further move the display object in the navigation direction when an expected arrival time from a current location of the vehicle to a right/left turn point on the path is less than or equal to a threshold value.

This allows the user to more easily notice the right/left turn point and to know the timing of a right or left turn at the right/left turn point.

The display device may further include a second input unit that acquires sensing information indicating an approach of another vehicle from a sensor that detects the approach of the other vehicle to the vehicle. The controller may further control a design of the display object in accordance with the sensing information acquired by the second input unit.

Accordingly, the attention of the user can be attracted to the approach of other vehicles by controlling the design of the display object. For example, in the case where the vehicle changes its traffic lane, it is possible to attract the attention of the user to the approach of other vehicles.

These general and specific aspects may be realized by a system, a method, an integrated circuit, a computer program, or a computer-readable recording medium such as a CD-ROM, or may be realized by any combination of a system, a method, an integrated circuit, a computer program, or a computer-readable recording medium. Moreover, the recording medium as referred to herein may be a non-transitory recording medium.

Hereinafter, one embodiment will be described in detail with reference to the drawings.

The embodiment described below illustrates one generic or specific example of the present disclosure. Numerical values, shapes, materials, constituent elements, the arrangement and positions of constituent elements, the form of connection of constituent elements, steps, a sequence of steps, and so on in the following embodiment are merely one example, and do not intend to limit the scope of the present disclosure. Among the constituent elements in the following embodiment, those that are not recited in any one of the independent claims which define the generic concept of the present disclosure are described as arbitrary constituent elements.

Note that each drawing is a schematic diagram and does not necessarily provide precise depiction. Substantially the same constituent elements are given the same reference signs throughout the drawings, and their detailed description is omitted or simplified.

Embodiment

[Overall Configuration]

FIG. 1 is a diagram showing an example of use of a display device according to an embodiment of the present disclosure.

Display device 100 according to the present embodiment is configured as a head-up display (HUD) and mounted on vehicle 2. As one specific example, display device 100 may be built in dashboard 2b of vehicle 2.

Display device 100 projects video image light representing display object 10 onto windshield 2a of vehicle 2. As a result, the video image light is reflected off windshield 2a and transmitted to, for example, user 1 who is the driver of vehicle 2. Accordingly, user 1 visually recognizes display object 10 as a virtual image through windshield 2a. That is, display device 100 allows user 1 to visually recognize display object 10 as a virtual image. Note that allowing user 1 to visually recognize display object 10 as a virtual image in this way is hereinafter also referred to as displaying display object 10, and the operation of projecting the video image light representing the display object is synonymous with the operation of displaying display object 10. Windshield 2a is one example of a display medium. In the present embodiment, the display medium is windshield 2a, but when vehicle 2 includes a combiner, display device 100 may project video image light onto the combiner that serves as the display medium.

Windshield 2a is a translucent plate-like display medium. Thus, display device 100 allows user 1 to visually recognize display object 10 as a virtual image while showing a background such as a road surface through windshield 2a to user 1. That is, AR achieves display of display object 10 in a real background.

Display object 10 is an image shaped to point to one direction. As one specific example, display object 10 is a three-dimensional image like an arrowhead. Note that the one direction is the direction of the tip end of the arrowhead and hereinafter also referred to as a pointed direction. The pointed direction of display object 10 is oriented to the direction of guiding vehicle 2 to a destination, i.e., a navigation direction.

Therefore, the use of display device 100 allows a driver as user 1 to see display object 10 while seeing the outside world ahead and without large eye movements. Thus, the driver is able to drive more carefully while grasping the navigation direction.

Figure 2:
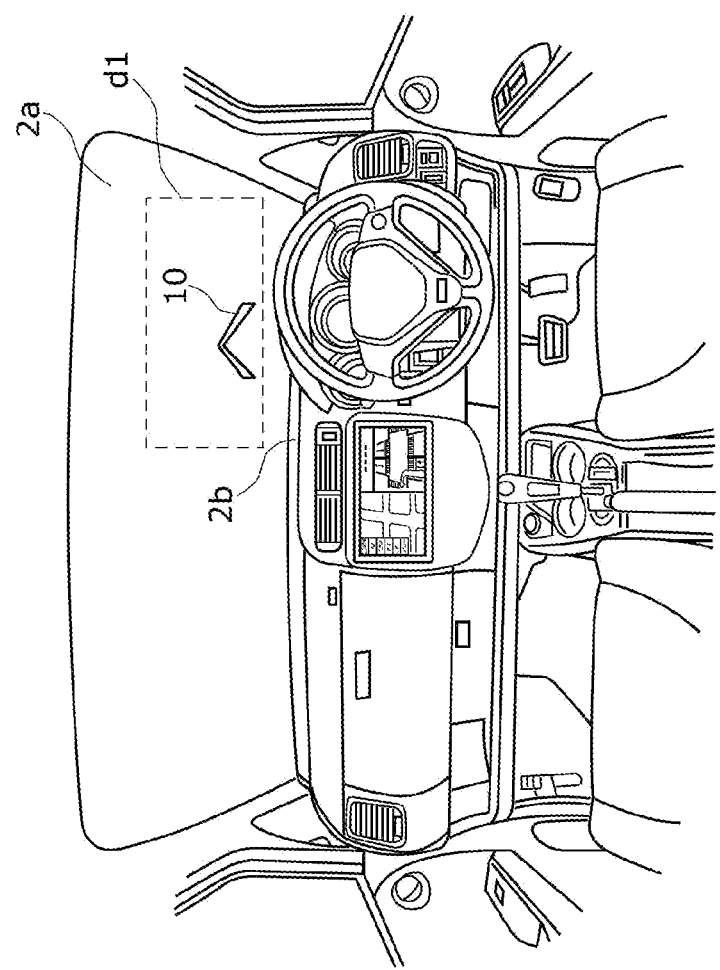
FIG. 2 is a diagram showing one example of the interior of a vehicle that includes the display device according to the embodiment.

FIG. 2 is a diagram showing one example of the interior of vehicle 2 that includes display device 100 according to the present embodiment.

Display device 100 that is put in dashboard 2b out of sight projects video image light onto windshield 2a. For example, as a result of the projection of the video image light by display device 100, display object 10 appears as a virtual image within display range d1 of windshield 2a.

Figure 3:
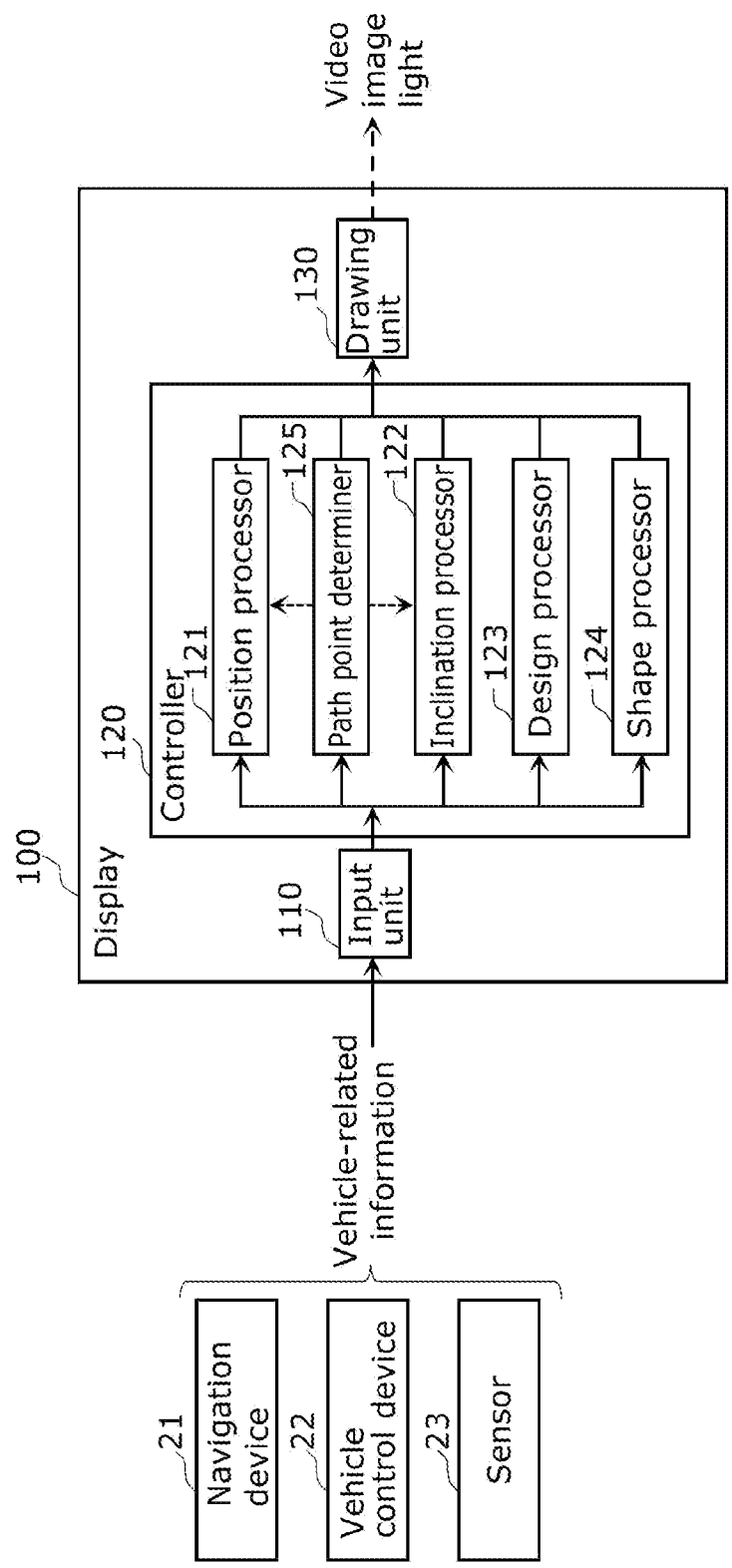
FIG. 3 is a block diagram illustrating a functional configuration of the display device according to the embodiment.

FIG. 3 is a block diagram illustrating a functional configuration of display device 100 according to the present embodiment.

Display device 100 includes input unit 110, controller 120, and drawing unit 130.

Input unit 110 acquires vehicle-related information from each of navigation device 21, vehicle control device 22, and sensor 23, all of which are mounted on vehicle 2.

Navigation device 21 is a device for navigating vehicle 2 to a destination, using a satellite positioning system such as a global positioning system (GPS). Navigation device 21 outputs vehicle position information that indicates the current location of vehicle 2, path information that indicates the path from the current location of vehicle 2 to the destination, and vehicle azimuth information that indicates the travel direction of vehicle 2 as the aforementioned vehicle-related information.

Vehicle control device 22 may be configured as, for example, an electronic control unit (ECU) mounted on vehicle 2 and output vehicle speed information that indicates the travelling speed of vehicle 2 as the aforementioned vehicle-related information.

Sensor 23 detects objects such as people or other vehicles around vehicle 2 and outputs sensing information that indicates the result of the detection as the aforementioned vehicle-related information. For example, sensor 23 may detect objects such as people or other vehicles by light detection and ranging (LiDAR).

Controller 120 determines a display form of display object 10, using the vehicle-related information acquired by input unit 110. Specifically, controller 120 includes position processor 121, inclination processor 122, design processor 123, shape processor 124, and path-point determiner 125.

Path-point determiner 125 determines a path point on the path indicated by the aforementioned path information and notifies position processor 121 and inclination processor 122 of the determined path point.

Position processor 121 determines the position of display object 10 visually recognized by user 1, using the path point determined by path-point determiner 125. This position is a position in a three-dimensional space and includes a lateral position in the breadth direction of vehicle 2, a depth position in the travel direction of vehicle 2, and a height from the road surface.

Inclination processor 122 determines the mode of inclination of display object 10, using the path point determined by path-point determiner 125. The mode of inclination is determined by the yaw, roll, and pitch angles of display object 10.

Design processor 123 determines the design of display object 10. Note that the design of display object 10 according to the present embodiment refers to coloration or brightness of display object 10 and includes a dynamic change in coloration or brightness.

Shape processor 124 determines the shape of display object 10. Note that the shape of display object 10 according to the present embodiment is defined by the overall length or width of display object 10. The overall length refers to the length of display object 10 in the pointed direction indicated by display object 10, and the width refers to the length of display object 10 in the direction perpendicular to the pointed direction. Shape processor 124 determines the shape of display object 10 by changing the ratio between the overall length and the width.

Controller 120 outputs display-form information that indicates the form of display including the aforementioned position, the aforementioned mode of inclination, the aforementioned design, and the aforementioned shape to drawing unit 130.

Drawing unit 130 acquires the display-form information from controller 120 and draws display object 10 in accordance with the display-form information. For example, drawing unit 130 may include a light source and an optical system and generate video image light representing display object 10 in the form of display indicated by the display-form information so as to allow user 1 to visually recognize display object 10 in the form of display. Then, drawing unit 130 projects the video image light onto windshield 2a. As a result, object 10 with the determined mode of inclination, the determined design, and the determined shape is visually recognized at the determined position by user 1. That is, as to the mode of inclination, drawing unit 130 projects the video image light representing display object 10 in the mode of inclination determined by inclination processor 122 of controller 120 onto windshield 2a mounted on vehicle 2 so as to cause the video image light to be reflected off windshield 2a toward user 1 in vehicle 2 and to allow user 1 to visually recognize display object 10 in the mode of inclination as a virtual image through windshield 2a.

Figure 4:
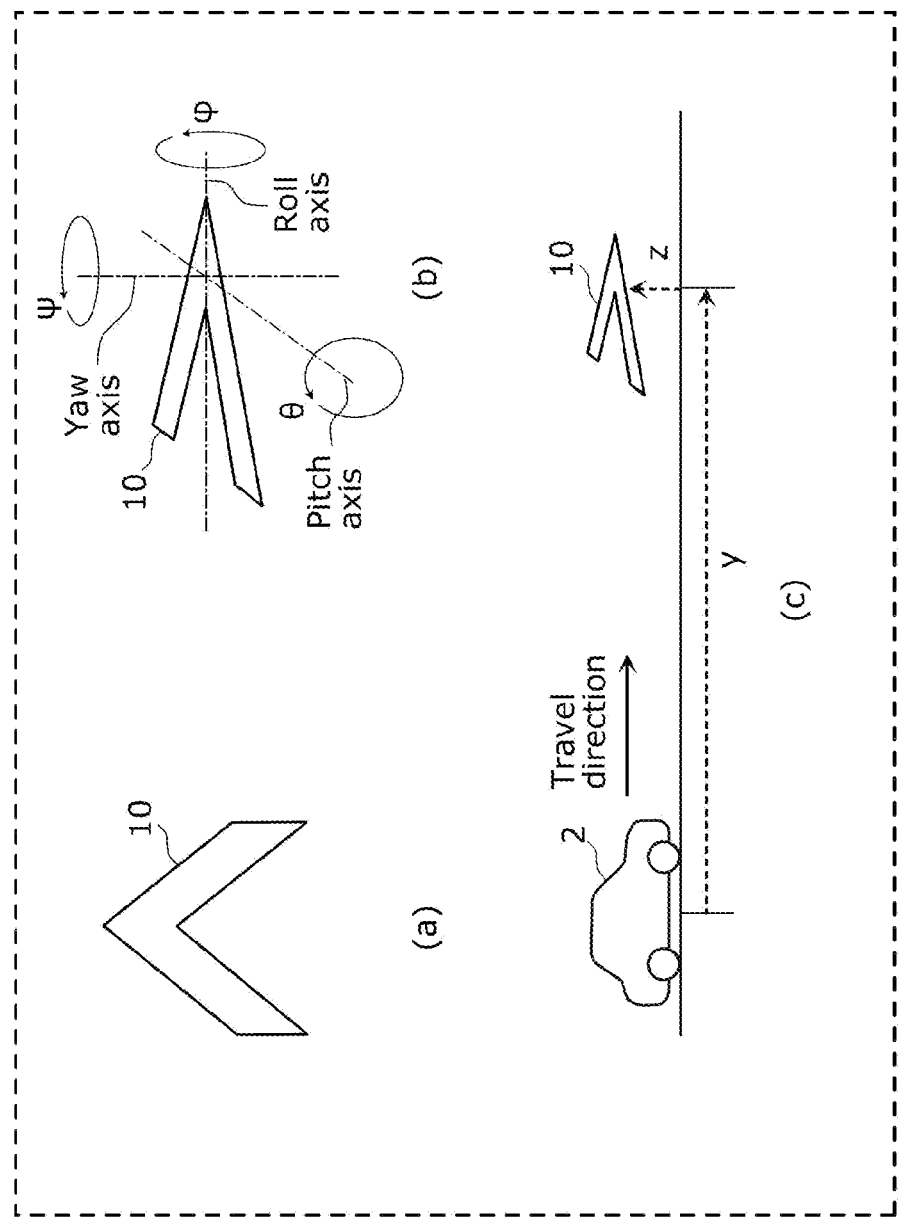
FIG. 4 is a diagram showing one example of a display object according to the embodiment.

FIG. 4 is a diagram showing one example of display object 10 according to the present embodiment. Note that (a) in FIG. 4 shows the top view of display object 10, (b) in FIG. 4 shows the perspective view of display object 10, and (c) in FIG. 4 shows the position of display object 10 in the travel direction of vehicle 2 and in the height direction.

As illustrated in (a) and (b) in FIG. 4, display object 10 is formed into a flat plate-like and approximately V or inverted V shape. Inclination processor 122 of controller 120 determines the mode of inclination of display object 10 by controlling yaw angle $\psi$, roll angle $\varphi$, and pitch angle $\theta$ of display object 10.

Yaw angle $\psi$ is the angle of rotation of display object 10 about a yaw axis extending in the thickness direction of display object 10 as a central axis. For example, in the case where the pointed direction of display object 10 coincides with the travel direction of vehicle 2, yaw angle $\psi$ of display object 10 is 0°.

Roll angle $\varphi$ is the angle of rotation of display object 10 about a roll axis extending in the pointed direction of display object 10 as a central axis. For example, in the case where display object 10 is arranged along a horizontal plane, roll angle $\varphi$ of display object 10 is 0°.

Pitch angle $\theta$ is the angle of rotation of display object 10 about a pitch axis extending in a direction perpendicular to the yaw axis and the roll shaft as a central axis. For example, in the case where display object 10 is arranged along a horizontal plane, pitch angle $\theta$ of display object 10 is 0°.

As illustrated in (c) in FIG. 4, position processor 121 of controller 120 determines position y of display object 10 in the travel direction of vehicle 2 on the basis of, for example, the vehicle speed information. Position y is indicated as the distance from vehicle 2 in the travel direction. Position processor 121 further determines position z as the height of display object 10. Position z is indicated as the height from the road surface on which vehicle 2 is travelling.

[Display Example of Display Object]

Figure 5:
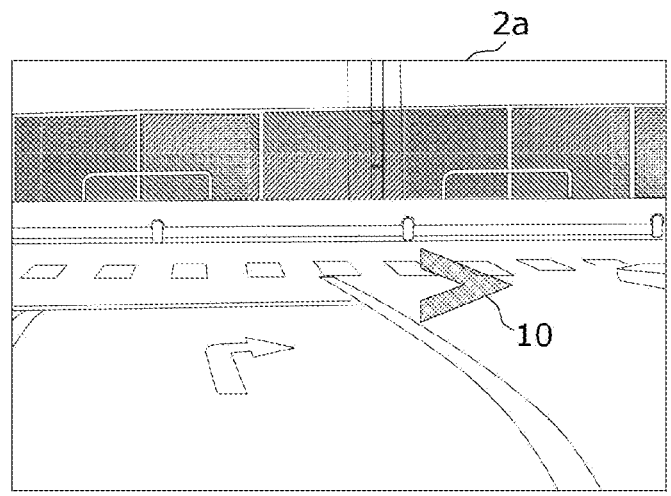
FIG. 5 is a diagram showing a specific example of a display object overlaid on a road surface by the display device according to the embodiment.

FIG. 5 is a diagram showing a specific example of display object 10 overlaid on a road surface by display device 100 according to the present embodiment.

For example, when vehicle 2 is approaching a T-junction, display device 100 determines the mode of inclination of display object 10 such that the pointed direction of display object 10 coincides with the navigation direction of vehicle 2. Then, display device 100 projects video image light representing display object 10 in the determined mode of inclination onto windshield 2a so as to allow user 1 to visually recognize display object 10.

In the example illustrated in FIG. 5, inclination processor 122 of controller 120 determines a rightward navigation direction on the basis of the aforementioned information including the vehicle position information, the path information, and the vehicle azimuth information. Then, inclination processor 122 sets yaw angle $\psi$ of display object 10 at, for example, −90° so that the pointed direction of display object 10 coincides with the navigation direction. Inclination processor 122 further sets roll angle $\varphi$ of display object 10 at, for example, 90° according to yaw angle $\psi$.

Such display object 10 is overlaid and displayed on the road surface of the T-junction in order to appear as a virtual image through windshield 2a.

Figure 6:
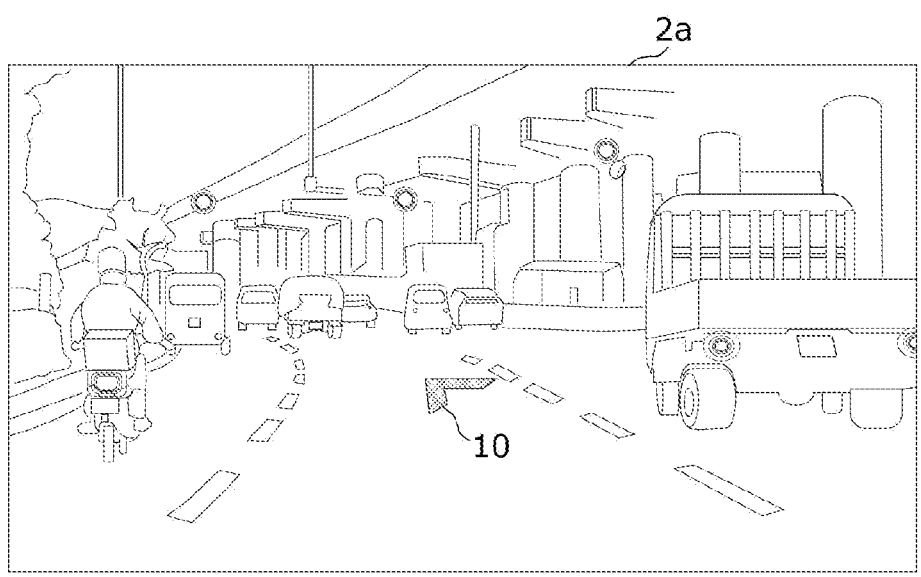
FIG. 6 is a diagram showing another specific example of a display object overlaid on a road surface by the display device according to the embodiment.

FIG. 6 is a diagram showing another specific example of display object 10 overlaid on a road surface by display device 100 according to the present embodiment.

Even in the case where vehicle 2 is travelling on a road other than an intersection such as a T-junction, display device 100 determines the mode of inclination of display object 10 such that the pointed direction of display object 10 coincides with the navigation direction of vehicle 2 as illustrated in FIG. 6. Then, display device 100 overlays and displays display object 10 in the determined mode of inclination on the road surface.

Figure 7:
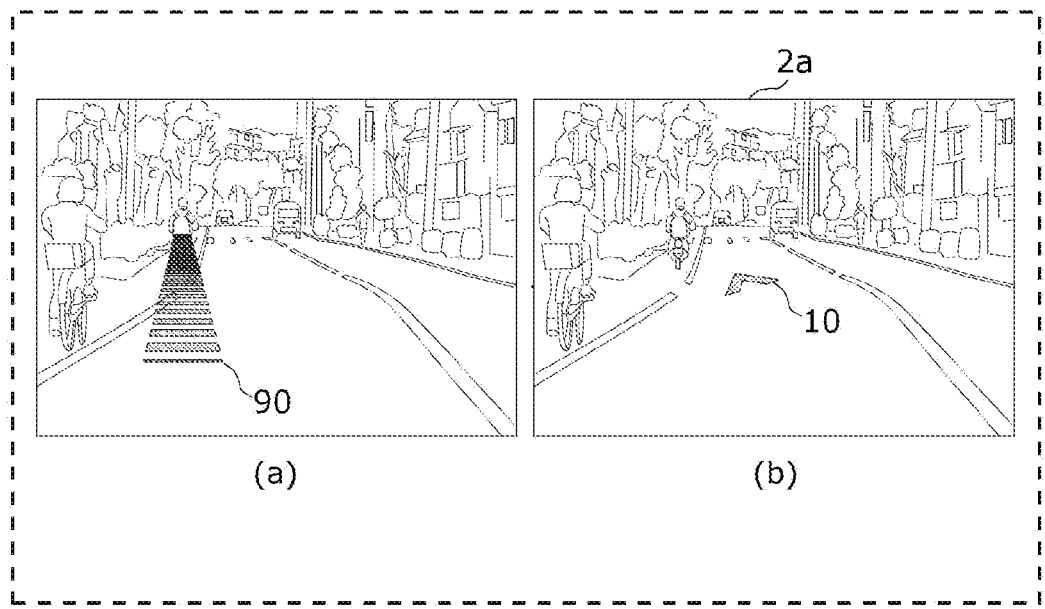
FIG. 7 is a diagram showing an example of comparison between a conventional display object and a display object overlaid on a road surface by the display device according to the embodiment.

FIG. 7 is a diagram showing an example of comparison between a conventional display object and display object 10 overlaid on a road surface by display device 100 according to the present embodiment. Specifically, (a) in FIG. 7 shows one example of a display object overlaid on the road surface by a conventional display device, and (b) in FIG. 7 shows one example of display object 10 overlaid on the road surface by display device 100.

As illustrated in (a) in FIG. 7, the conventional display device displays long carpet-like display object 90 overlaid on the road surface. The longitudinal direction of display object 90 coincides with the navigation direction. In other words, display object 90 is arranged along the path to a destination. Here, the navigation direction or the path may include errors if the navigation device uses a low-precision map or low-precision positioning. As a result, long display object 90 may deviate from the road surface as illustrated in (a) in FIG. 7. That is, overlay misregistration is likely to occur. Accordingly, display object 90 may hold the possibility of misleading the user and the possibility of causing user discomfort.

On the other hand, display device 100 according to the present embodiment displays arrowhead-shaped display object 10 overlaid on the road surface as illustrated in (b) in FIG. 7. Thus, even if the navigation direction or the path includes errors, it is possible to avoid misleading user 1 and to alleviate discomfort felt by user 1

Figure 8:
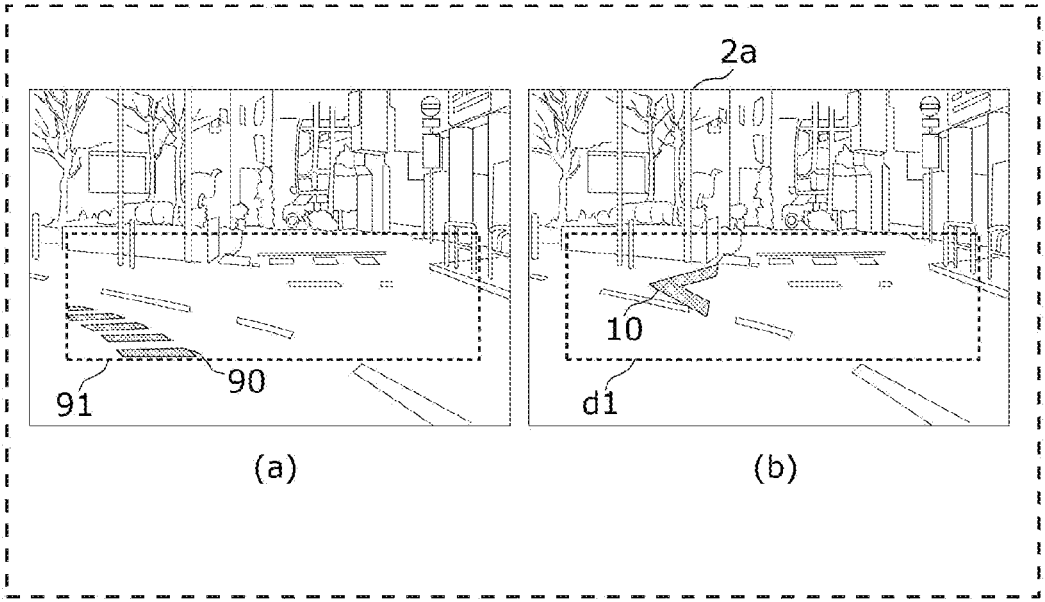
FIG. 8 is a diagram showing another example of comparison between a conventional display object and a display object overlaid on a road surface by the display device according to the embodiment.

FIG. 8 is a diagram showing another example of comparison between a conventional display object and display object 10 overlaid on a road surface by display device 100 according to the present embodiment. Specifically, (a) in FIG. 8 shows another example of the display object overlaid on the road surface by a conventional display device, and (b) in FIG. 8 shows another example of display object 10 overlaid on the road surface by display device 100.

As illustrated in (a) in FIG. 8, the conventional display device displays long carpet-like display object 90 overlaid on the road surface. Such display object 90 is displayed only within display range 91. Thus, in the case where part of display object 90 extends off display range 91 as illustrated in (a) in FIG. 8, that part is not displayed and display object 90 that is lost in part is displayed within display range 91. As a result, display object 90 may hold the possibility of misleading the user and the possibility of causing user discomfort.

On the other hand, display device 100 according to the present embodiment displays arrowhead-shaped display object 10 overlaid on the road surface as illustrated in (b) in FIG. 8. Accordingly, display object 10 is easily contained in display range d1, and the possibility of losing part of display object 10 is reduced. As a result, display object 10 can avoid misleading user 1 and alleviate discomfort felt by user 1.

[Yaw and Roll Angle Control of Display Object]

FIG. 9A is a diagram showing one example of controlling the yaw angle of display object 10 according to the present embodiment. Note that (a) in FIG. 9A shows one example of controlling yaw angle $\psi$, and (b) in FIG. 9A shows another example of controlling yaw angle $\psi$, different from the example illustrated in (a) in FIG. 9A.

First, path-point determiner 125 of controller 120 determines a path point. This path point is a point that is set on the path to navigate vehicle 2 to a destination. Path-point determiner 125 controls the position of the path point on the path indicated by the aforementioned path information, depending on the travelling speed of vehicle 2. A specific method of determining the position of the path point will be described later with reference to FIG. 9B.

In this determination of the path point, path-point determiner 125 may determine the path point nonlinearly relative to the travelling speed, or may determine the path point linearly relative to the travelling speed. In the case where the travelling speed of vehicle 2 is used in the control of display object 10, each constituent element included in controller 120, such as path-point determiner 125, may use the travelling speed indicated by the aforementioned vehicle speed information as the travelling speed of vehicle 2, and in the case where the distance from vehicle 2 is measured, each constituent element may use the current location of vehicle 2 indicated by the aforementioned vehicle position information as a reference position for the distance.

Next, inclination processor 122 determines the mode of inclination of display object 10 that points to the pointed direction as the navigation direction, by controlling yaw angle $\psi$ and roll angle $\varphi$ of display object 10 on the basis of the attribute of the determined path point. Specifically, inclination processor 122 controls yaw angle $\psi$ on the basis of the attribute of the path point and controls roll angle $\varphi$ in accordance with controlled yaw angle $\psi$.

In the determination of yaw angle $\psi$, inclination processor 122 determines yaw angle $\psi$ of display object 10 on the basis of the attribute of the path point as in the example illustrated in (a) or (b) in FIG. 9A. For example, the attribute of the path point may be the tangential direction at the path point on the path as illustrated in (a) in FIG. 9A. Note that inclination processor 122 determines this tangential direction as the aforementioned navigation direction. This navigation direction may be a direction expressed using the north direction as a reference. In the determination of the mode of inclination of display object 10, inclination processor 122 controls yaw angle $\psi$ of display object 10 such that the pointed direction of display object 10 coincides with the tangential direction serving as the navigation direction.

Alternatively, the attribute of the path point may be the position of the path point as illustrated in (b) in FIG. 9A. In the determination of the mode of inclination of display object 10, inclination processor 122 controls yaw angle $\psi$ of display object 10 such that the pointed direction of display object 10 coincides with a direction from vehicle 2 toward the path point. In this case, inclination processor 122 determines the direction from vehicle 2 to the path point as the navigation direction. This direction from vehicle 2 to the path point is hereinafter also referred to as a "path-point direction".

Figure 9B:
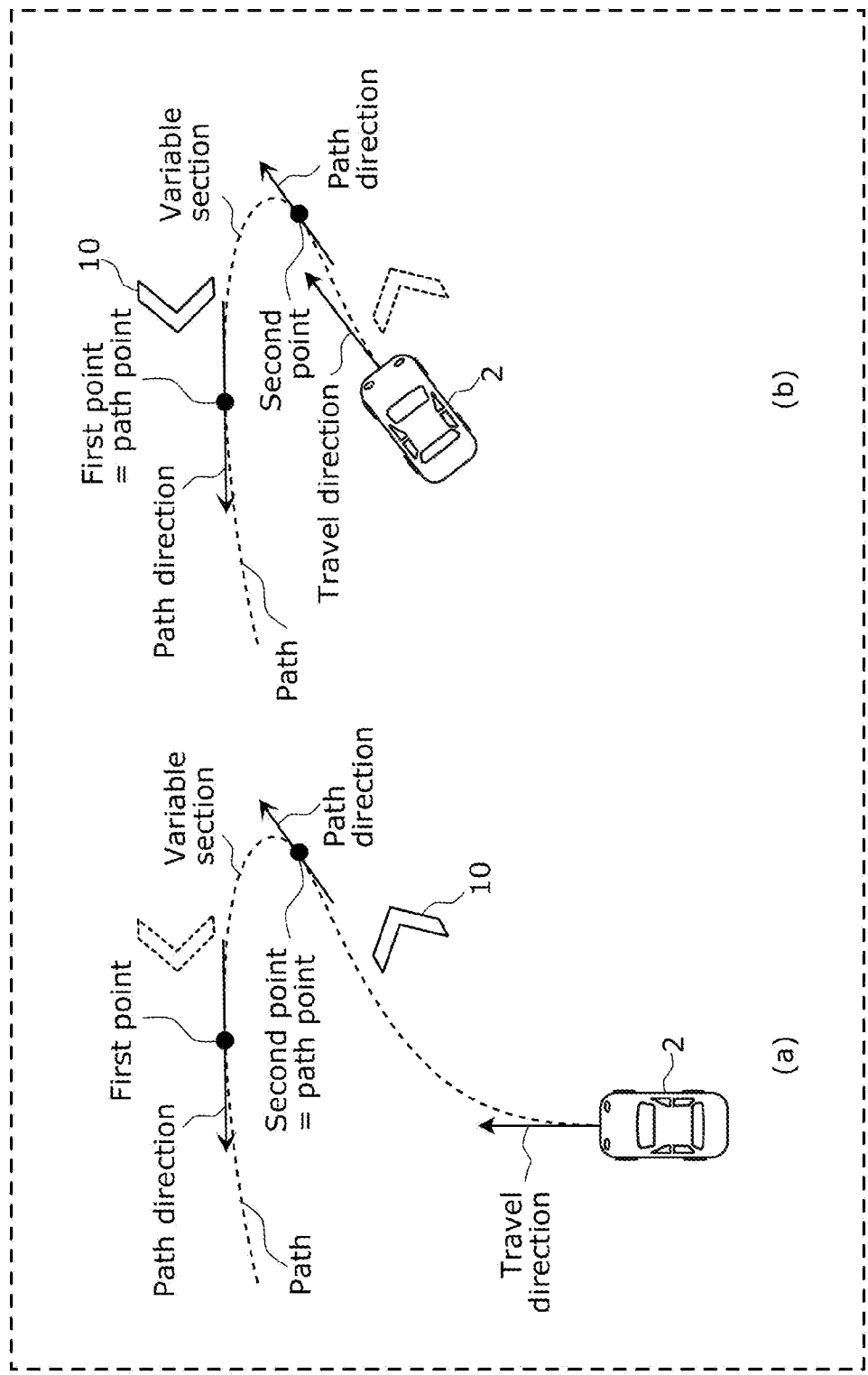
FIG. 9B is a diagram showing one example of a method of determining a path point according to the embodiment.

FIG. 9B is a diagram showing one example of the method of determining a path point according to the present embodiment. Note that (a) in FIG. 9B shows an example of determining a second point on the path as the position of the path point, and (b) in FIG. 9B shows an example of determining a first point on the path as the position of the path point.

For example, it is assumed, as illustrated in (a) in FIG. 9B, that vehicle 2 is travelling on a gentle right curve in the road and then approaches a sharp left curve in the road along the path. In this case, path-point determiner 125 first determines a position corresponding to the travelling speed of vehicle 2 on the path as the first point. For example, as the travelling speed of vehicle 2 becomes higher, path-point determiner 125 determines, as the first point, a position on the path that is away by a longer distance from vehicle 2 along the path, and as the travelling speed of vehicle 2 becomes lower, path-point determiner 125 determines, as the first point, a position on the path that is away by a shorter distance from vehicle 2 along the path.

Here, if a path direction that is the tangential direction at the first point on the path is used as the navigation direction, since the path direction is a leftward direction, yaw angle $\psi$ of display object 10 is controlled such that the pointed direction of display object 10 is directed to the left. However, in the case where vehicle 2 is approaching a gentle right curve in the road, the display of such display object 10 pointing to the leftward direction may mislead user 1 or cause user discomfort. Note that the aforementioned possibility of misleading the user or causing user discomfort lies not only in the case where the vehicle is travelling on a sharp curve such as a sharp left curve, but also in the case where the vehicle makes a right or left turn at a right/left turn point on the path. The right/left turn point is a point of intersection that allows a right or left turn.

Thus, path-point determiner 125 according to the present embodiment identifies a section including a sharp curve or a right/left turn point on the path and also uses this section to determine the position of the path point, instead of determining the position of the path point through simple use of the travelling speed of vehicle 2. In such a section including a sharp curve or a section in which vehicle 2 makes a right or left turn at a right/left turn point, the rate of change in the path direction is high. Therefore, path-point determiner 125 uses the rate of change in the path direction and identifies a section in which the absolute value for the rate of change is greater than a threshold value, as a variable section. Note that the rate of change in the path direction is the amount of change in the tangential direction on the path per unit length of the path. The unit length may, for example, be 100 m, and the amount of change in the tangential direction may be 45°. That is, the variable section is a section including a sharp curve or a section including a point of intersection for a right or left turn, and is also a section in which the tangential direction changes by 45° or more within the range of 100 m along the path.

Specifically, path-point determiner 125 determines the first point on the path depending on the travelling speed of vehicle 2. Then, path-point determiner 125 determines whether there is a variable section between the current location of vehicle 2 and the first point, the variable section being a section in which the absolute value for the rate of change in the path direction at each point on the path is greater than a threshold value. In the case where it is determined that there is a variable section, path-point determiner 125 sets a second point immediately before the variable section on the path. Then, path-point determiner 125 determines either the first point or the second point as the position of the path point depending on a difference between the path direction at the second point and the travel direction of vehicle 2.

For example, in the case where the difference between the path direction at the second point and the travel direction of vehicle 2 is out of a predetermined range as illustrated in (a) in FIG. 9B, path-point determiner 125 determines the second point as the position of the path point. This enables directing the pointed direction of display object 10 to the right and appropriately guiding user 1 or vehicle 2 along a right curve.

On the other hand, in the case where vehicle 2 is travelling on the right curve in the road and approaching the second point, the travel direction of vehicle 2 becomes closer to the path direction at the second point as illustrated in (b) in FIG. 9B. Thus, in the case where the difference between the path direction at the second point and the travel direction of vehicle 2 is within the predetermined range, path-point determiner 125 determines the first point as the position of the path point. This enables directing the pointed direction of display object 10 to the left and appropriately guiding user 1 or vehicle 2 along a sharp left curve. Or, it is possible to appropriately guide user 1 or vehicle 2 in a left-turn direction at a right/left turn point. Note that the aforementioned predetermined range may, for example, be 10°.

While FIG. 9B shows one example of the case in which a gentle curve, a sharp curve opposite to the direction of the gentle curve, and a right or left turn are sequential along the path, the present disclosure is also applicable to other cases. For example, even if the path is curved in only one direction, it is possible to direct the pointed direction of display object 10 to an appropriate direction and it is possible to avoid misleading user 1 or vehicle 2 and to alleviate user discomfort. Although the path direction in the example illustrated in FIG. 9B is the tangential direction on the path, the path direction may be the direction from vehicle 2 toward the path point, i.e., the path-point direction.

In this way, path-point determiner 125 according to the present embodiment controls the position of the path point depending on the travelling speed of vehicle 2. Since this path point is used to present the navigation direction by display object 10, display object 10 is capable of presenting an appropriate navigation direction responsive to the travelling speed to user 1. Specifically, path-point determiner 125 determines the first point on the path depending on the travelling speed of vehicle 2. Then, in the case where it is determined that there is a variable section between the current location of vehicle 2 and the first point, the variable section being a section in which the absolute value for the rate of change in the path direction at each point on the path is greater than the threshold value, and where the difference between the travel direction of vehicle 2 and the path direction at the second point located immediately before the variable section is out of the predetermined range, path-point determiner 125 determines the second point as the position of the path point. On the other hand, in the case where the above difference is within the predetermined range, path-point determiner 125 determines the first point as the position of the path point.

Therefore, in the case where there is a variable section, either one of the first and second points before and after the variable section that depends on the travel direction of vehicle 2 is determined as the position of the path point. Accordingly, it is possible to reduce the possibility that display object 10 points to an inappropriate navigation direction relative to the travel direction of vehicle 2.

Figure 10:
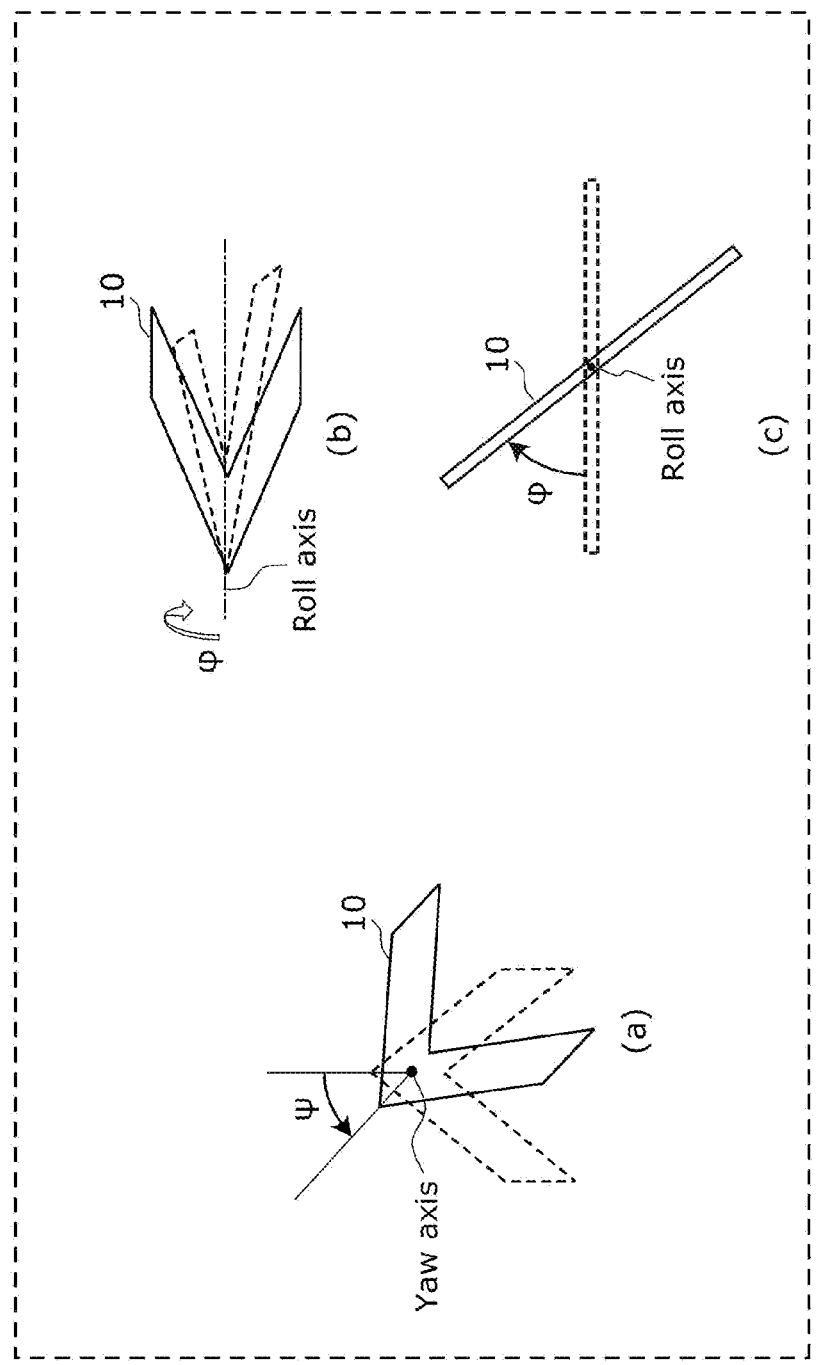
FIG. 10 is a diagram showing one example of controlling the roll angle of a display object according to the embodiment.

FIG. 10 is a diagram showing one example of controlling the roll angle of display object 10 according to the present embodiment. Note that (a) in FIG. 10 shows display object 10 when viewed from a yaw-axis direction, (b) in FIG. 10 shows display object 10 when viewed from a direction perpendicular to the roll axis, and (c) in FIG. 10 shows display object 10 when viewed from a roll-axis direction.

Inclination processor 122 of controller 120 determines yaw angle $\psi$ of display object 10, for example as illustrated in (a) in FIG. 10, i.e., as illustrated in the example illustrate in FIG. 9A. Inclination processor 122 determines roll angle $\varphi$ in accordance with yaw angle $\psi$ of display object 10 as illustrated in (b) and (c) in FIG. 10. Specifically, as yaw angle $\psi$ increases, inclination processor 122 determines a larger role angle $\varphi$. For example, in the case where display object 10 rotates counterclockwise about the yaw axis as a central axis, yaw angle $\psi$ increase. At this time, roll angle $\varphi$ increases to cause display object 10 to be inclined in the vertical direction as illustrated in (b) in FIG. 10.

In this way, as illustrated in FIGS. 9A to 10, inclination processor 122 according to the present embodiment determines the mode of inclination of display object 10 pointing to the pointed direction as the navigation direction, by controlling yaw angle $\psi$ and roll angle $\varphi$ of display object 10 on the basis of the attribute of the path point. Thus, display object 10 can be displayed like a bird or plane view to lead vehicle 2 to the destination. Accordingly, display object 10 can be formed not into a long carpet-like shape but into a short shape pointing to one direction such as an arrowhead. As a result, it is possible reduce the occurrence of overlay misregistration or loss of display object 10 and alleviate discomfort felt by user 1 due to the overlay misregistration or loss of display object 10 while appropriately notifying user 1 of the navigation direction by the one direction pointed to by display object 10. Moreover, since roll angle $\varphi$ is also controlled, even if display object 10 extends off the road when vehicle 2 is travelling on a curve or the like in the road, it is possible to alleviate discomfort felt on the extension off of display object 10 by user 1.

Inclination processor 122 also controls yaw angle $\psi$ of display object 10 such that the pointed direction coincides with the tangential direction as illustrated in (a) in FIG. 9A. Or, inclination processor 122 controls yaw angle $\psi$ of display object 10 such that the pointed direction coincides with the direction from vehicle 2 toward the path point as illustrated in (b) in FIG. 9A. Accordingly, it is possible to notify user 1 of an appropriate navigation direction for directing vehicle 2 to the path point by the pointed direction of display object 10.

[Position Control of Display Object]

Figure 11:
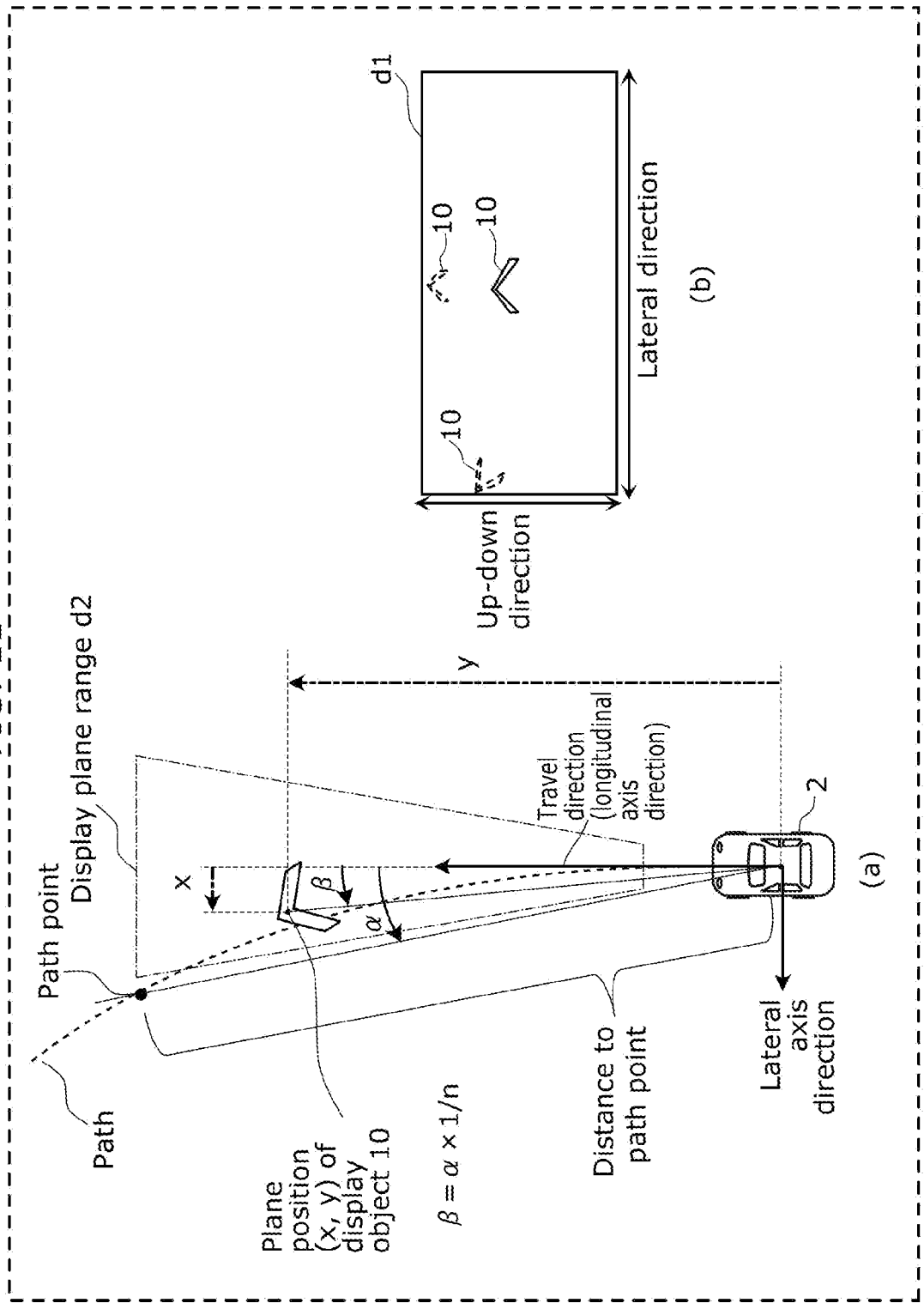
FIG. 11 is a diagram showing one example of controlling the position of a display object according to the embodiment.

FIG. 11 is a diagram showing one example of controlling the position of display object 10 according to the present embodiment. Note that (a) in FIG. 11 indicates the positional relationship between vehicle 2 and display object 10 when viewed from above vehicle 2, and (b) in FIG. 11 shows the position of display object 10 visually recognized in display range d1 of windshield 2a.

First, position processor 121 of controller 120 identifies the position of the path point determined by path-point determiner 125 on the basis of the notification from path-point determiner 125.

Then, position processor 121 of controller 120 determines a plane position (x, y) of display object 10 as illustrated in (a) in FIG. 11. The plane position (x, y) refers to the position of display object 10 arranged in a plane. The plane may be a road surface on which vehicle 2 is travelling, or may be a tangent plane to the road surface. Position y in plane position (x, y) indicates a position along a longitudinal axis that is an axis along the travel direction of vehicle 2 that is one of two axes arranged along the above plane and orthogonal to each other. That is, position y is a depth position of visually recognized display object 10 in the travel direction of vehicle 2. Positon x in plane position (x, y) indicates a position along a lateral axis that is orthogonal to the longitudinal axis and that is one of the two axes arranged along the above plane. That is, position x is a lateral position of visually recognized display object 10 in the breadth direction of vehicle 2. Hereinafter, the breadth direction is also referred to as the lateral direction or the lateral axial direction. Note that position processor 121 may use the travel direction indicated by the aforementioned vehicle azimuth information as the travel direction of vehicle 2.

Specifically, position processor 121 controls position y depending on the travelling speed of vehicle 2. For example, as the travelling speed of vehicle 2 becomes higher, position processor 121 determines position y that is farther away from vehicle 2, and as the travelling speed of vehicle 2 becomes lower, positon processor 121 determines position y that is closer to vehicle 2. In the determination of position y, position processor 121 may determine position y nonlinearly relative to the travelling speed, or may determine position y linearly relative to the travelling speed.

As to position x, position processor 121 controls position x depending on the direction from vehicle 2 to the path point. Specifically, position processor 121 identifies angle α between the travel direction of vehicle 2 and the path-point direction from vehicle 2 to the path point. Then, position processor 121 calculates angle β that is 1/n times of angle α and identifies a direction that forms angle β with the travel direction of vehicle 2. Note that this direction forming angle β is a direction inclined from the travel direction toward to the path-point direction. Then, position processor 121 determines the lateral axial position of a point located at position y from among points on a straight line along the direction forming angle β. Referring to the aforementioned 1/n times, n is a real number greater than one and may, for example, be three. Alternatively, position processor 121 may calculate 1/n times of the distance in the lateral axial direction from vehicle 2 to the path point and determine, as position x, a point that is away by the aforementioned 1/n-fold distance to the path point from vehicle 2 in the lateral axial direction. Moreover, position processor 121 may determine angle β or position x linearly relative to the lateral axial distance from angle α or vehicle 2 to the path point.

In the determination of the plane position (x, y) of display object 10, position processor 121 limits the plane position (x, y) of display object 10 such that display object 10 does not extend off display plane range d2 in the aforementioned plane. As illustrated in (b) in FIG. 11, display plane range d2 is the range corresponding to display range d1 of windshield 2a. The length of display plane range d2 in the travel direction corresponds to the length of display range d1 in the up-down direction, and the length of display plane range d2 in the lateral direction corresponds to the length of display range d1 in the lateral direction. As a result, it can be said that position processor 121 limits plane position (x, y) of display object 10 such that display object 10 does not extend off display range d1. That is, position processor 121 limits position x of display object 10 such that display object 10 becomes visually recognizable within a predetermined range in the breadth direction of vehicle 2. Position processor 121 also limits position y of display object 10 such that display object 10 becomes visually recognizable within a predetermined range in the up-down direction of vehicle 2.

In this way, position processor 121 according to the present embodiment controls the lateral position, i.e., position x, of display object 10 depending on the direction from vehicle 2 to the path point. Accordingly, it is possible to reduce the possibility that display object 10 sticks to a boundary at the lateral edge of display range d1 or suddenly moves off the boundary as a result of controlling n in the aforementioned 1/n times. Note that the situation in which display object 10 sticks to the boundary refers to a situation in which display object 10 does not depart from the boundary for a certain period of time while vehicle 2 is travelling.

Position processor 121 also limits the lateral position of display object 10 such that display object 10 becomes visually recognizable within display range d1. This reduces the possibility that the left or right portion of display object 10 becomes lost or that display object 10 becomes invisible.

Position processor 121 also controls the depth position, i.e., position y, of display object 10 depending on the travelling speed of vehicle 2. For example, as the travelling speed of vehicle 2 becomes lower, a position closer to vehicle 2 is determined as the depth position. This reduces the possibility that, when vehicle 2 is travelling slowly on a relatively congested road, display object 10 is overlaid on a vehicle travelling ahead.

Position processor 121 also limits the depth position of display object 10 such that display object 10 becomes visually recognizable within display range d1. This reduces the possibility that the upper or lower portion of display object 10 becomes lost or that display object 10 becomes invisible.

[Shape or Pitch Angle Control of Display Object]

Figure 12:
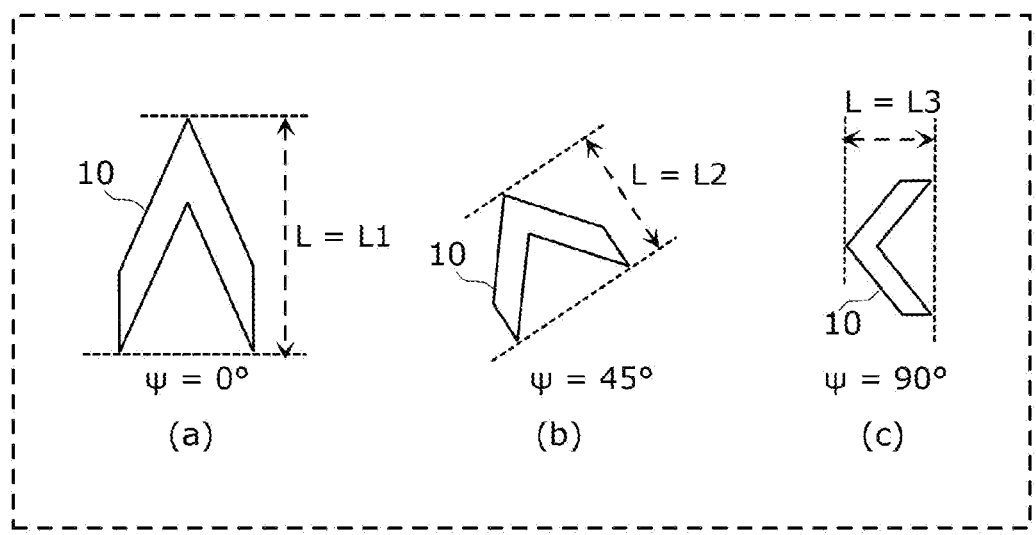
FIG. 12 is a diagram showing one example of controlling the shape of a display object according to the embodiment.

FIG. 12 is a diagram showing one example of controlling the shape of display object 10 according to the present embodiment.

As illustrated in (a) to (c) in FIG. 12, shape processor 124 of controller 120 changes the shape of display object 10 depending on yaw angle ψ. For example, shape processor 124 changes overall length L of display object 10. For example, in the case where yaw angle ψ is 0° as illustrated in (a) in FIG. 12, shape processor 124 sets overall length L to L1, and in the case where yaw angle ψ is 45° as illustrated in (b) in FIG. 12, shape processor 124 sets overall length L to L2 (L2<L1). In the case where yaw angle ψ is 90°, shape processor 124 sets overall length L to L3 (L3<L2). This change in overall length L changes the ratio between overall length L and the width and consequently changes the shape of display object 10.

For example, in the case where display object 10 is at far position y, user 1 visually recognizes display object 10 in a direction closer to the horizontal direction. Thus, if the shape of display object 10 is not changed in such a case, display object 10 visually recognized by user 1 in display range d1 has a short width in the up-down direction. That is, display object 10 looks like collapsed in the longitudinal direction.

As a result, user 1 has difficulty in grasping the pointed direction of display object 10.

In view of this, shape processor 124 according to the present embodiment increases overall length L of display object 10 as yaw angle $\psi$ approaches 0° as illustrated in FIG. 12. This shortens the width in the up-down direction of display object 10 visually recognized by user 1 even if display object 10 is at far position y. Thus, it is possible to reduce the possibility that display object 10 looks like collapsed.

Alternatively, inclination processor 122 of controller 120 may control pitch angle $\theta$ of display object 10 to reduce the possibility that display object 10 looks like collapsed. That is, in the determination of the mode of inclination of display object 10, inclination processor 122 further controls pitch angle $\theta$ of display object 10 depending on yaw angle $\psi$ of display object 10. For example, inclination processor 122 increases pitch angle $\theta$ of display object 10 as yaw angle $\psi$ of display object 10 approaches 0°. That is, pitch angle $\theta$ is controlled such that the pointed direction of display object 10 becomes closer to the vertical direction.

Although, in the aforementioned example, controller 120 controls the shape or pitch angle $\theta$ of display object 10 depending on yaw angle $\psi$, the shape or pitch angle $\theta$ of display object 10 may also be controlled not only depending on yaw angle $\psi$ but also depending on position y. For example, in the case where the distance from vehicle 2 to position y is greater than or equal to a threshold value, controller 120 may control the shape or pitch angle $\theta$ of display object 10 depending on yaw angle $\psi$.

In this way, controller 120 according to the present embodiment controls the shape or pitch angle $\theta$ of display object 10 depending on yaw angle $\psi$ of display object 10. This improves visibility of display object 10 even if the depth position, i.e., position y, of display object 10 is far from vehicle 2.

[Design Control of Display Object]

Figure 13:
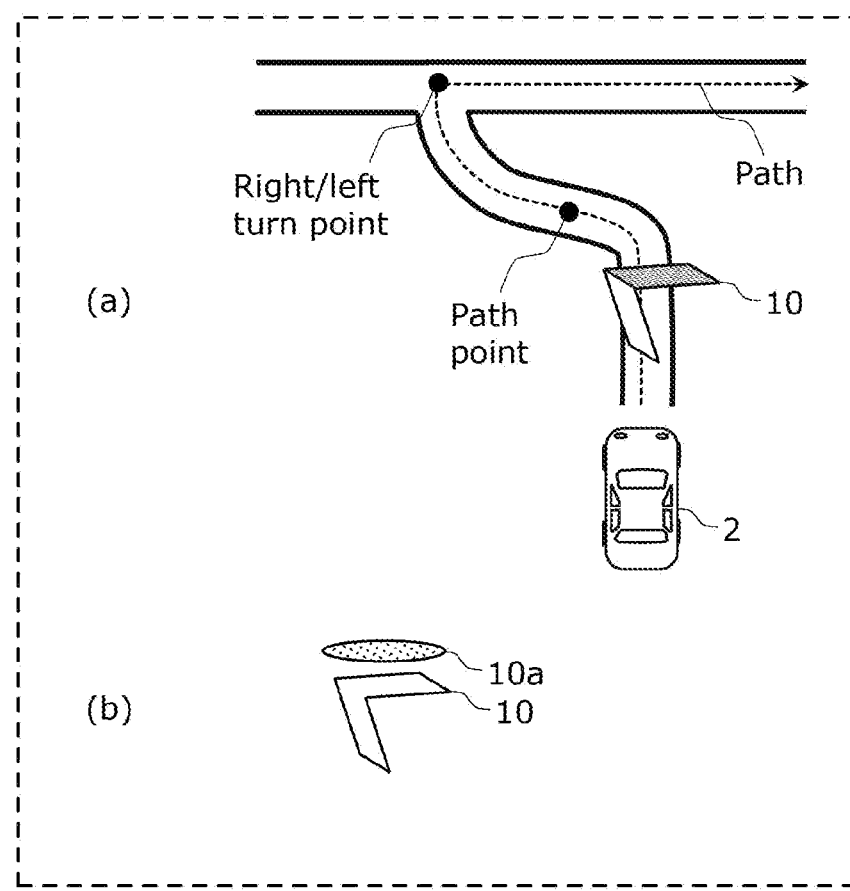
FIG. 13 is a diagram showing one example of controlling the design of a display object according to the embodiment.

FIG. 13 is a diagram showing one example of controlling the design of display object 10 according to the present embodiment.

For example, as illustrated in (a) in FIG. 13, vehicle 2 may travel on a road curved to the left along the path indicated by the path information and then make a right turn at a right/left turn point. In this case, design processor 123 of controller 120 controls the design of display object 10 depending on the distance from the current location of vehicle 2 to the right/left turn point that is located forward of the path point on the path. For example, design processor 123 measures the distance along path from the current location of vehicle 2 indicated by the vehicle position information to the right/left turn point indicated by the path information. Then, if the path information indicates to make a right turn at the right/left turn point when the distance to the right/left turn point becomes less than or equal to the threshold value, design processor 123 changes the color or brightness of the right half of display object 10. As one specific example, design processor 123 may change the color of the right half of display object 10, the overall color of which is green, to yellow. Alternatively, design processor 123 may change the color of part of the right half of display object 10, i.e., the color of the right end, to yellow. As another alternative, design processor 123 may display another object 10*a* indicating a right turn around display object 10 as illustrated in (b) in FIG. 13, or may cause object 10*a* to blink on and off. Note that object 10*a* indicates a right or left turn from the relative positional relation between display object 10 and object 10*a*. The threshold value for the distance to the right/left turn point may, for example, be 300 m.

Accordingly, it is possible to indicate the navigation direction for guiding vehicle 2 to the left curve by controlling yaw angle $\psi$ of display object 10 to direct the pointed direction of display object 10 to the left, and it is also possible to appropriately notify user 1 of the presence of a right turn following the left curve by changing the design of display object 10.

Alternatively, design processor 123 may control the design of display object 10 depending on an expected arrival time from the current location of vehicle 2 to the right/left turn point that is located forward of the path point on the path. For example, design processor 123 may measure the distance along the path from the current location of vehicle 2 indicated by the vehicle position information and the right/left turn point indicated by the path information and calculate the expected arrival time by dividing the measured distance by the travelling speed of vehicle 2 indicated by the vehicle speed information. Then, if the path information indicates to make a right turn at the right/left turn point when the expected arrival time up to the right/left turn point becomes less than or equal to a threshold value, design processor 123 changes the color or brightness of the right half of display object 10. Although, in the example illustrated in FIG. 13, the left curve is followed by the right turn, the directions of the curve and the turn may be reversed. A case is also possible in which a right or left turn is followed by a curve, or two curves are sequential, or a right turn and a left turn are sequential. The threshold value for the expected arrival time may, for example, be in the range of 10 seconds to one minute.

In this way, it is possible, according to the present embodiment, to notify user 1 of the navigation direction to the right/left turn point by the mode of inclination of display object 10 and to appropriately notify user 1 of a right or left turn at the right/left turn point by controlling the design of display object 10. That is, even if the navigation direction to the right/left turn point is different from the right- or left-turn direction at the right/left turn point, it is possible to appropriately notify user 1 of both of the navigation direction and the right- or left-turn direction at the same time. That is, even if the pointed direction of display object 10 is directed to the left in order to guide vehicle 2 along the road curved to the left, it is possible to appropriately notify user 1 of the need to make a right turn at the next right/left turn point.

Figure 14:
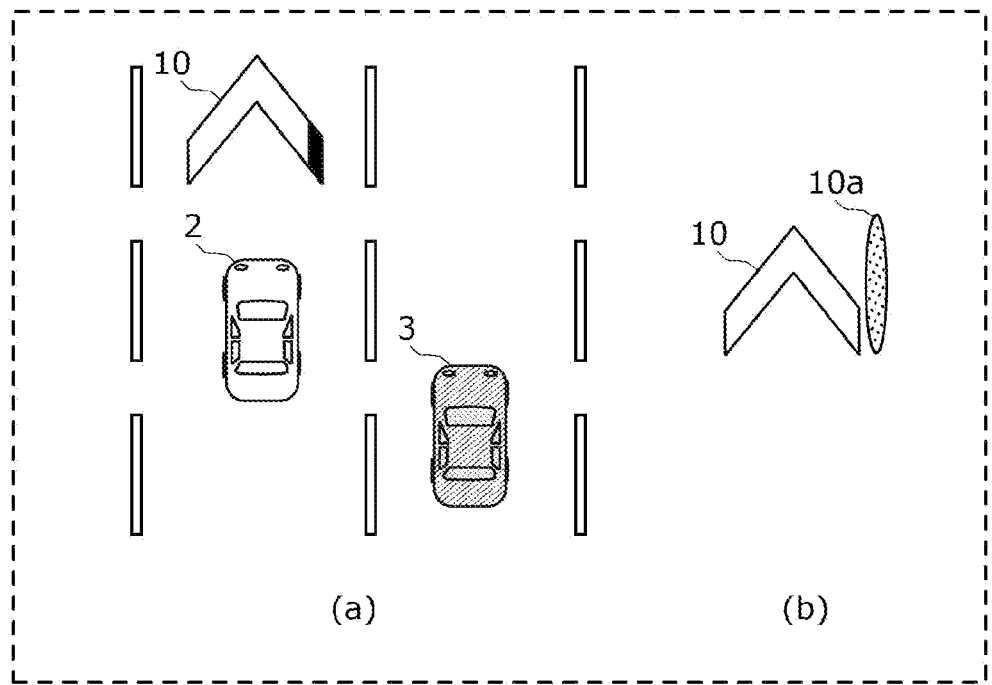
FIG. 14 is a diagram showing another example of controlling the design of a display object according to the embodiment.

FIG. 14 is a diagram showing another example of controlling the design of display object 10 according to the present embodiment.

For example, in the case where vehicle 2 is travelling on a road with a plurality of traffic lanes as illustrated in (a) in FIG. 14, another vehicle 3 is approaching vehicle 2. At this time, design processor 123 notifies user 1 of the approach of other vehicle 3 by controlling the color of display object 10.

Specifically, input unit 110 of display device 100 acquires sensing information indicating the approach of other vehicle 3 from sensor 23 that detects the approach of other vehicle 3 to vehicle 2. Note that the function of acquiring such sensing information is part of the function of input unit 110, and it can also be said that input unit 110 includes a second input unit that achieves this function.

Design processor 123 of controller 120 controls the design of display object 10 in accordance with the sensing information acquired by input unit 110. For example, the sensing information indicates that other vehicle 3 is approaching from the right side of vehicle 2. In this case, design processor 123 changes the color or brightness of the right end of display object 10. As one specific example, design processor 123 may change the color of this right end from green to red. Alternatively, design processor 123 may cause this right end to blink on and off in red. As another alternative, design processor 123 may cause the color of the entire or part of the right half of display object 10 other than the right end of display object 10 to change or blink on and off. As yet another alternative, design processor 123 may display object 10a for attracting attention of user 1 around display object 10 as illustrated in (b) in FIG. 14, or may cause object 10a to blink on and off.

In this way, it is possible, according to the present embodiment, to attract attention of user 1 to the approach of other vehicle 3 by controlling the design of display object 10. For example, it is possible to attract attention of user 1 to the approach of other vehicle 3 in cases such as where vehicle 2 changes the traffic lane or where vehicle 2 enters a rendezvous point of the traffic lanes.

[Movement Control of Display Object]

Figure 15:
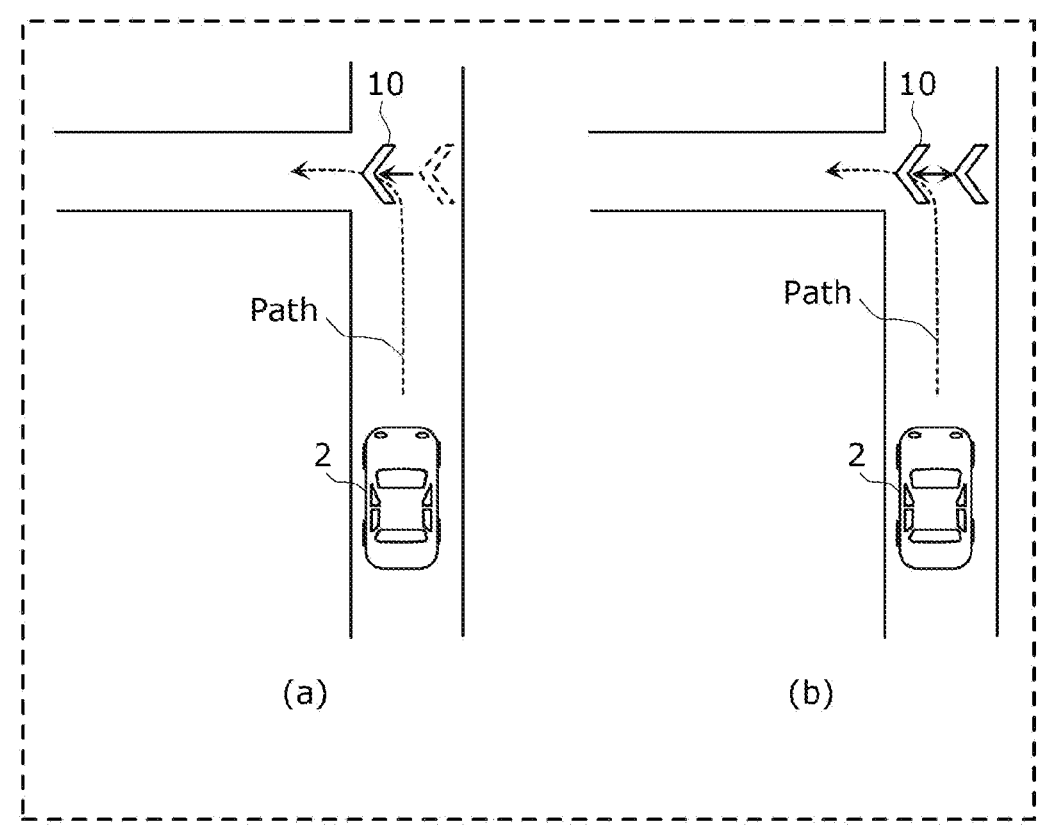
FIG. 15 is a diagram showing one example of controlling the movement of a display object according to the embodiment.

FIG. 15 is a diagram showing one example of controlling the movement of display object 10 according to the present embodiment.

For example, vehicle 2 may travel along the path indicated by the path information and make a left turn at a right/left turn point as illustrated in (a) in FIG. 15. In this case, position processor 121 of controller 120 moves display object 10 in the navigation direction when the distance along the path from the current location of vehicle 2 to the right/left turn point becomes less than or equal to a threshold value. Note that moving display object 10 in the navigation direction can also be said as moving display object 10 in the pointed direction. In the example illustrated in (a) in FIG. 15, position processor 121 moves display object 10 to the left.

Alternatively, position processor 121 may move display object 10 in the navigation direction when the expected arrival time from the current location of vehicle 2 to the right/left turn point on the path becomes less than or equal to a threshold value. For example, position processor 121 may measure the distance along the path between the current location of vehicle 2 indicated by the vehicle position information and the right/left turn point indicated by the path information and calculate the expected arrival time by dividing the measured distance by the travelling speed of vehicle 2 indicated by the vehicle speed information. Then, design processor 123 moves display object 10 in the navigation direction when the expected arrival time to the right/left turn point becomes less than or equal to the threshold value.

This enables user 1 to easily notice a right or left turn at the right/left turn point.

Alternatively, position processor 121 may repeatedly move display object 10 in the navigation direction as illustrated in (b) in FIG. 15, instead of moving it only once. For example, position processor 121 may return display object 10 to the original position after having moved display object 10 in the navigation direction, and then move display object 10 again in the navigation direction.

In this way, it is possible, according to the present embodiment, by allow user 1 to easily notice the right/left turn point as well as to notify user 1 of the timing of the right or left turn at the right/left turn point by moving display object 10 in the navigation direction.

[Height or Design Control of Display Object]

Figure 16:
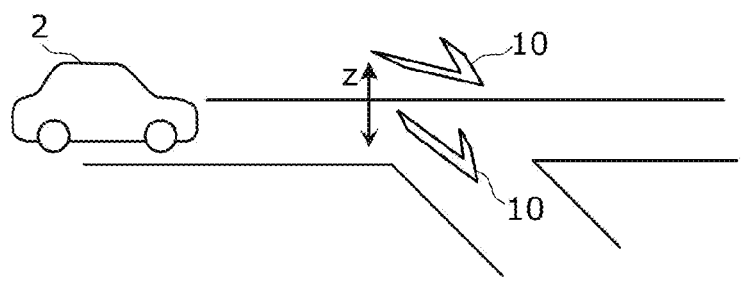
FIG. 16 is a diagram showing one example of controlling the height of a display object according to the embodiment.

FIG. 16 is a diagram showing one example of controlling the height of display object 10 according to the present embodiment.

Position processor 121 of controller 120 controls the height, i.e., position z, of display object 10 depending on the reliability of navigation by navigation device 21.

For example, input unit 110 of display device 100 acquires reliability information indicating the reliability of navigation from navigation device 21. Note that the function of acquiring such reliability information is part of the function of input unit 110, and it can also be said that input unit 110 includes a first input unit that archives this function.

The reliability information is information generated by navigation device 21 and may be included in the aforementioned vehicle-related information. The reliability of navigation corresponds to the accuracy of the path set by navigation device 21 and the accuracy of the current location of vehicle 2 and the travel direction thereof detected by navigation device 21. For example, navigation device 21 may identify the reliability of navigation of vehicle 2 on the basis of, for example, the intensity of receiving GPS signals from a satellite and generate reliability information indicating the identified reliability. As one specific example, in the case where the intensity of receiving GPS signals is low, navigation device 21 may generate reliability information indicating low reliability, and in the case where the intensity of receiving GPS signals is high, navigation device 21 may generate reliability information indicating high reliability. Alternatively, navigation device 21 may identify the reliability of navigation depending on the type of a map used to navigate vehicle 2 and generate reliability information indicating the identified reliability. For example, in the case where a high-precision map is used in navigation, navigation device 21 may generate reliability information indicating relatively high reliability, and in the case where an ordinary map is used in navigation, navigation device 21 may generate reliability information indicating relatively low reliability. Note that navigation device 21 may switch the use of a high-precision map and an ordinary map depending on the travelling point of vehicle 2, and for example, may use the high-precision map when vehicle is travelling on a highway.

Then, position processor 121 controls the height of visually recognized display object 10 from the road surface depending on the reliability information acquired by input unit 110. For example, as the reliability indicated by the reliability information becomes lower, position processor 121 may determine higher position z as the height of display object 10, and as the reliability indicated by the reliability information becomes higher, position processor 121 may determine lower position z as the height of display object 10.

Figure 17:
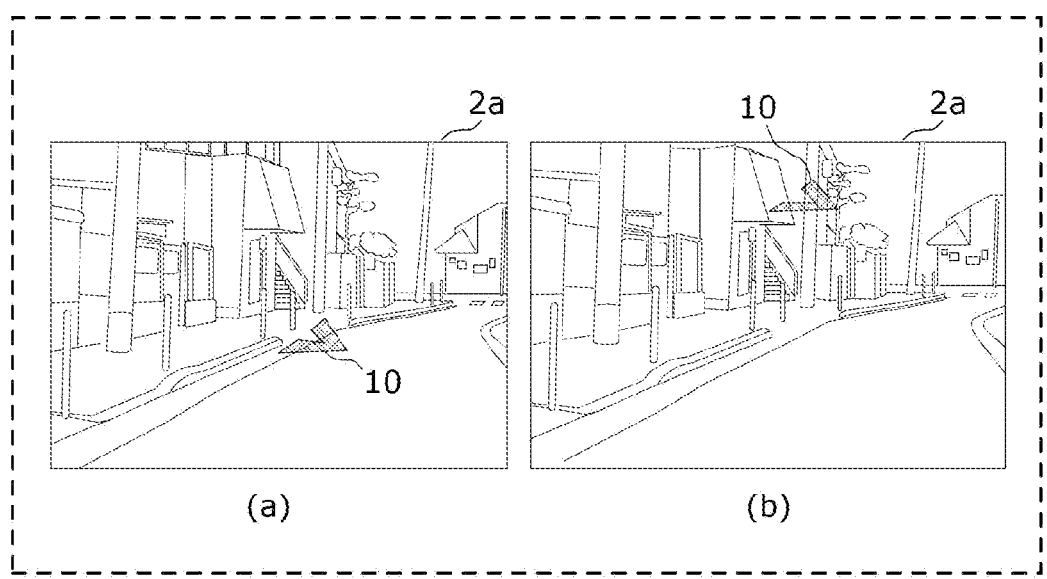
FIG. 17 is a diagram showing a more specific example of controlling the height of a display object according to the embodiment.

FIG. 17 is a diagram showing a more specific example of controlling the height of display object 10 according to the present embodiment. Note that (a) in FIG. 17 shows one example of display object 10 that has not undergone height control based on reliability, and (b) in FIG. 17 shows one example of display object 10 that has undergone height control based on reliability.

For example, in the case where the reliability of navigation is low and the height of display object 10 is not controlled depending on the reliability, display object 10 may be overlaid but deviates from the road surface as illustrated in (a) in FIG. 17. That is, overlay misregistration may occur. Besides, the pointed direction of display object 10 may also deviate from the actual navigation direction. However, position processor 121 according to the present embodiment displays display object 10 at a high position as illustrated in (b) in FIG. 17 when the reliability of navigation is low. Display object 10 that is displayed apparently at a high position above the road surface is hardly recognized as overlay misregistration by user 1. Besides, the deviation in the pointed direction of display object 10 is also hardly recognized by user 1. Accordingly, it is possible to alleviate discomfort felt by user 1 due to the overlay misregistration and the deviation in the pointed direction.

Although, in the examples illustrated in FIGS. 16 and 17, the height of display object 10 is controlled depending on the reliability information, i.e., depending on the reliability of navigation, other control may be performed. For example, design processor 123 of controller 120 may control the dynamic design of visually recognized display object 10 depending on the reliability information. For example, design processor 123 may cause display object 10 to blink on and off when the reliability indicated by the reliability information is lower than or equal to a threshold value. The blinking cycle may, for example, be 0.5 seconds. This creates a period of time during which display object 10 is not displayed. Thus, it is possible to alleviate user discomfort caused by overlay misregistration of display object 10. Note that, in the case where the reliability is indicated by a numerical value from 0 to 1, the threshold value for the reliability may, for example, be 0.5.

In this way, controller 120 according to the present embodiment controls either the height of visually recognized display object 10 or the dynamic design of display object 10 depending on the reliability information. Accordingly, it is possible to alleviate discomfort felt by user 1 due to overlay misregistration or a deviation in the pointed direction of display object 10.

Figure 18:
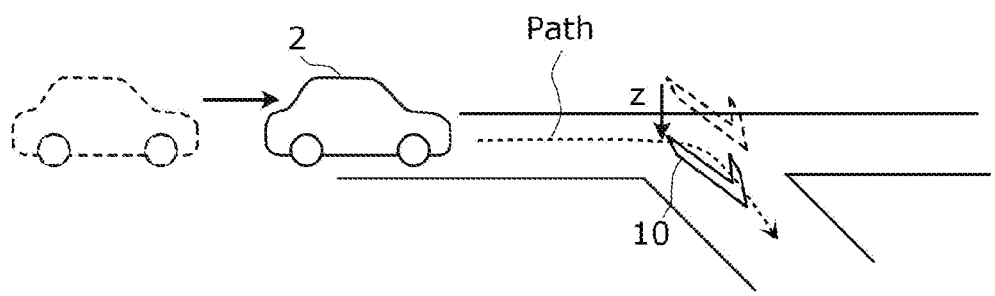
FIG. 18 is a diagram showing another example of controlling the height of a display object according to the embodiment.

FIG. 18 is a diagram showing another example of controlling the height of display object 10 according to the present embodiment.

As illustrated in FIG. 18, position processor 121 of controller 120 may control the height of visually recognized display object 10 from the road surface depending on the distance along the path from the current location of vehicle 2 to a right/left turn point on the path. For example, position processor 121 may lower the height of display object 10, i.e., position z, when vehicle 2 approaches a right/left turn point and the distance to the right/left turn point becomes shorter. More specifically, position processor 121 may lower the height of display object 10 as the distance from vehicle 2 to the right/left turn point becomes shorter, or may lower the height of display object 10 when the distance becomes less than or equal to a threshold value.

In this way, the present embodiment allows user 1 to more easily notice a right or left turn at the right/left turn point. It is also possible to prompt user 1 to slow down vehicle 2, i.e., it is possible to prompt user 1 to drive carefully.

[Offset Control of Display Object]

Figure 19:
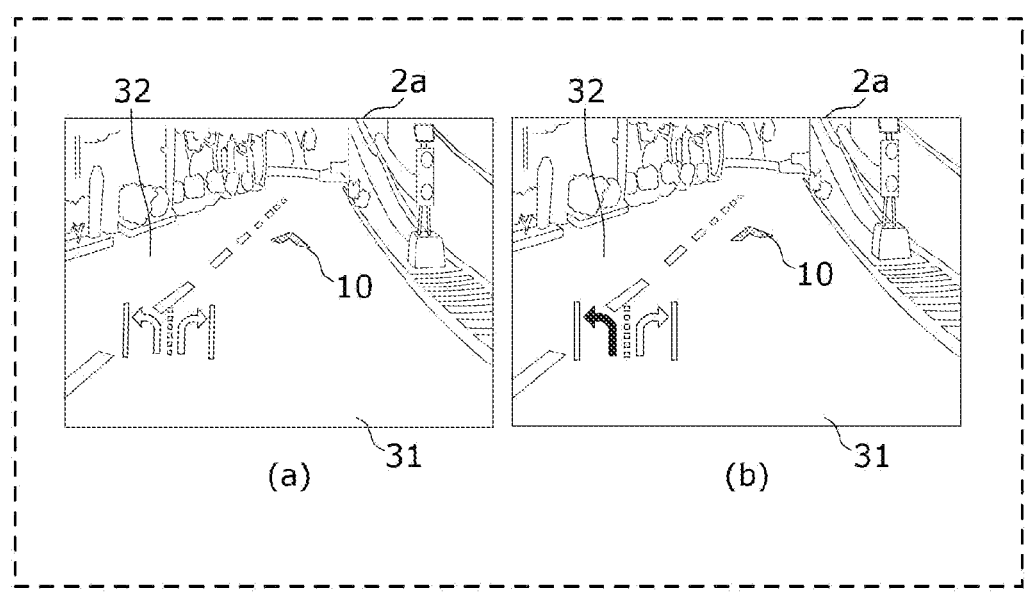
FIG. 19 is a diagram showing one example of controlling an offset in the yaw angle of a display object according to the embodiment.

FIG. 19 is a diagram showing one example of controlling offsets of yaw angle ψ and roll angle φ of display object 10 according to the present embodiment.

In the case where navigation recommends traffic lane 32 different from traffic lane 31 on which vehicle 2 is travelling as a recommended traffic lane, inclination processor 122 of controller 120 applies offsets to yaw angle ψ and roll angle φ of display object 10. Note that (a) in FIG. 19 shows an example of not applying offsets to display object 10, and (b) in FIG. 19 shows an example of applying offsets to display object 10.

For example, in the case where the path information indicates to make a right or left turn at a right/left turn point that is located forward of travelling vehicle 2 and the road on which vehicle 2 is travelling includes multiple traffic lanes, navigation device 21 detects a traffic lane for the right or left turn as a recommended traffic lane. For example, in the case where the path information indicates to make a right turn, a right traffic lane is detected as a recommended traffic lane, and in the case where the path information indicates to make a left turn, a left traffic lane is detected as a recommended traffic lane. Then, navigation device 21 outputs recommended-traffic-lane information indicating the recommended traffic lane. Input unit 110 of display device 100 acquires this recommended-traffic-lane information as the vehicle-related information.

For example, in the case where input unit 110 does not acquire the recommended-traffic-lane information, inclination processor 122 does not apply offsets to display object 10 as illustrated in (a) in FIG. 19. However, in the case where input unit 110 has acquired the recommended-traffic-lane information, inclination processor 122 applies offsets to display object 10 as illustrated in (b) in FIG. 19. For example, the recommended-traffic-lane information may indicate traffic lane 32 as the recommended traffic lane. Thus, in the case where inclination processor 122 has determined from the vehicle position information that vehicle 2 is travelling on traffic lane 31 and has determined that the recommended traffic lane is not traffic lane 31 but traffic lane 32, inclination processor 122 applies, to display object 10, offsets for directing the pointed direction to traffic lane 32. As one specific example of applying offsets, inclination processor 122 may add an offset of ±2° to yaw angle ψ of display object 10 and add an offset of the angle corresponding to the offset of ±2° to roll angle φ of display object 10. As a result, in the example illustrated in FIG. 19, display object 10 is displayed inclined by 2° toward traffic lane 32. Note that inclination processor 122 may apply offsets to display object 10, irrespective of whether or not the traffic lane on which vehicle 2 is travelling is the recommended traffic lane. In this case, even if the traffic lane on which vehicle 2 is travelling cannot be identified, it is possible to apply offsets to display object 10. The offset angle of roll angle φ may or may not be equal to the offset angle of yaw angle ψ.

In this way, it is possible, according to the present embodiment, to direct the pointed direction of display object 10 to the recommended traffic lane by the application of offsets and to prompt user 1 to travel on the recommended traffic lane. Note that the offsets may be fixed angles, or may be variable angles. For example, as the travelling speed of vehicle 2 becomes higher, inclination processor 122 may apply smaller offsets, and as the travelling speed of vehicle 2 becomes lower, inclination processor 122 may larger offsets.

[Flowchart of Processing Operations]

Figure 20:
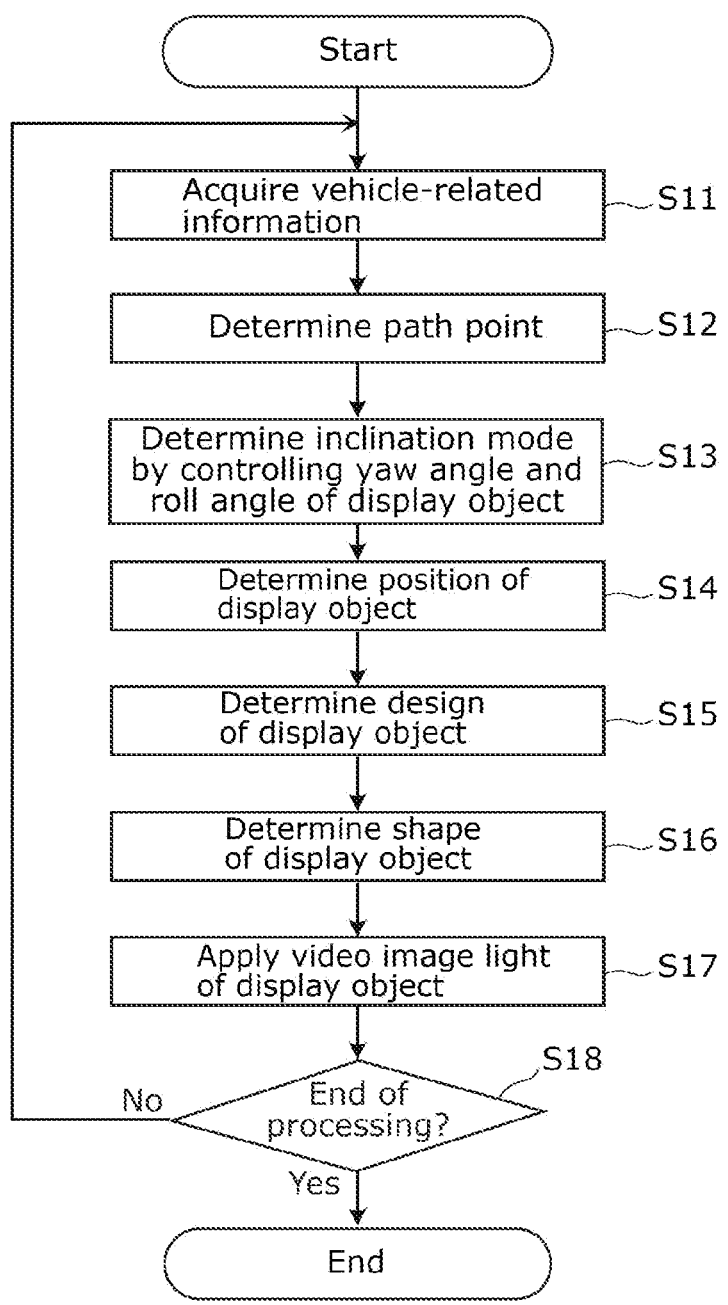
FIG. 20 is a flowchart showing processing operations of the display device according to the embodiment.

FIG. 20 is a flowchart illustrating processing operations of display device 100 according to the embodiment.

First, display device 100 acquires the vehicle-related information from navigation device 21, vehicle control device 22, and sensor 23 (step S11). Then, display device 100 determines a path point from the path indicated by the path information included in the vehicle-related information (step S12). Then, display device 100 determines the mode of inclination of display object 10 by controlling yaw angle ψ and roll angle φ of display object 10 on the basis of, for example, the attribute of the path point (step S13). At this time, display device 100 may determine the mode of inclination by further controlling pitch angle θ.

Then, display device 100 determines the position (x, y, z) of display object 10 on the basis of the path point and the current location of vehicle 2 (step S14), determines the design of display object 10 (step S15), and further determines the shape of display object 10 (step S16).

Next, display device 100 applies video image light representing display object 10 in the mode of inclination determined in step S13 and having the position, design, and shape determined in step S14 to S16, toward windshield 2 (step S17). As a result, user 1 visually recognizes display object 10 through windshield 2*a*.

Here, display device 100 determines whether to end display of display object 10 (step S18). For example, in cases such as where vehicle 2 is parked, where the engine of vehicle 2 is stopped, or where display device 100 has received an instruction to stop display, display device 100 determines to end the display of display object 10 (Yes in step S18). Otherwise, display device 100 determines not to end the display of display object 10 (No in step S18) and repeatedly executes the processing from step S11. In the case where the processing in step S11 is repeated, the latest vehicle-related information is acquired at this time. Thus, it is possible to update the mode of inclination, position, design, and shape of display object 10 at any time in accordance with the latest vehicle-related information.

Other Embodiments

While the display device according to one or more aspects of the present disclosure has been described based on the embodiment, the present disclosure is not intended to be limited to this embodiment. The present disclosure may also include other variations obtained by making various modifications conceivable by those skilled in the art to the embodiment, without departing from the scope of the present disclosure.

For example, although controller 120 according to the embodiment described above includes position processor 121, inclination processor 122, design processor 123, and shape processor 124, controller 120 may not include each of these processing units other than inclination processor 122. Although inclination processor 122 controls yaw angle $\psi$, roll angle $\varphi$, and pitch angle $\theta$ of display object 10, pitch angle $\theta$ may be fixed.

In the above-described embodiment, each constituent element may be configured as dedicated hardware, or may be realized by executing a software program suitable for each constituent element. Each constituent element may also be realized by a program execution unit such as a central processing unit (CPU) or a processor reading out and executing a software program recorded on a hard disk or a recording medium such as a semiconductor memory. Here, the software program for realizing display device 100 or the like according to the above-described embodiment may cause a computer to execute each step included in, for example, the flowchart illustrated in FIG. 20.

Note that the present disclosure also includes the following cases.

(1) At least one of the devices described above is specifically a computer system configured by, for example, a microprocessor, a read only memory (ROM), a random access memory (RAM), a hard disk unit, a display unit, a keyboard, and a mouse. The RAM or the hard disk unit stores computer programs. At least one of the devices described above achieves its function as a result of the microprocessor operating in accordance with the computer programs. Here, the computer programs are configured by combining a plurality of instruction codes indicating commands to the computer in order to achieve predetermined functions.

(2) Some or all of the constituent elements that configure at least one of the devices described above may be configured with one system LSI (large scale integration). The system LSI is a super-multi-function LSI manufactured by integrating a plurality of structural units on a single chip, and is specifically a computer system configured to include a microprocessor, a ROM, a RAM, and so on. The RAM stores computer programs. The system LSI achieves its function as a result of the microprocessor operating in accordance with the computer programs.

(3) Some or all of the constituent elements that configure at least one the devices described above may be configured as an IC card detachable from the device or as a stand-alone module. The IC card or the module is a computer system configured by a microprocessor, a ROM, a RAM, and so on. The IC card or the module may include the aforementioned super-multi-function LSI. The IC card or the module achieves its function as a result of the microprocessor operating in accordance with the computer programs. The IC card or the module may also be tamper-resistant.

(4) The present disclosure may be realized as the method described above. The present disclosure may also be realized as a computer program for causing a computer to execute the method, or as digital signals consisting of computer programs.

The present disclosure may also be realized as a computer-readable recording medium having computer programs or digital signals recorded thereon, examples of which include a flexible disc, a hard disk, a Compact Disc (CD)-ROM, a DVD, a DVD-ROM, a DVD-RAM, a Blu-ray (registered trademark) Disc (BD), and a semiconductor memory. As another alternative, the present disclosure may also be realized as digital signals recorded on such a recording medium.

The present disclosure may also be realized by computer programs or digital signals transmitted via, for example, a telecommunication line, a wireless or wired communication line, a network represented by the Internet, or data broadcasting.

The present disclosure may also be realized by another independent computer system by transmitting programs or digital signals recorded on a recording medium or by transmitting programs or digital signals via, for example, a network.

Further Information about Technical Background to this Application

The disclosures of the following patent applications including specification, drawings, and claims are incorporated herein by reference in their entirety: Japanese Patent Application No. 2020-146228 filed on Aug. 31, 2020, and PCT International Application No. PCT/JP2021/031521 filed on Aug. 27, 2021.

INDUSTRIAL APPLICABILITY

The display device according to the present disclosure achieves the effect of alleviating user discomfort on display objects and may be applicable to, for example, a vehicle-mounted head-up display.

The invention claimed is:
1. A display device comprising:
a control circuit that determines a mode of inclination of a display object that is an image shaped to point to one direction, and that further determines a position of the display object visually recognized by a user in a vehicle; and a projector that projects light representing the display object in the mode of inclination determined by the control circuit onto a display medium provided in the vehicle, to cause the light to be reflected off the display medium toward the user in the vehicle to enable the user to visually recognize the display object in the mode of inclination as a virtual image through the display medium, wherein the control circuit determines the mode of inclination of the display object that points to the one direction as a navigation direction, by controlling a yaw angle and a roll angle of the display object in accordance with an attribute of a path point that is set on a path for navigation of the vehicle to a destination, wherein the attribute includes a direction of the path at the path point or a position of the path point, wherein a depth position of the display object in a traveling direction of the vehicle is placed between a current position of the vehicle on the path and the path point, and wherein the control circuit moves a lateral position of the display object in a lateral direction of the vehicle towards a right/left turn direction indicated by the navigation direction when a distance from a current location of the vehicle to a right/left turn point, which is a point of intersection that allows a right or left turn on the path, is less than or equal to a first threshold value.

2. The display device according to claim 1,
wherein the control circuit further controls the lateral position of the display object visually recognized in accordance with a direction from the vehicle to the path point, the lateral position being a position in the lateral direction of the vehicle.

3. The display device according to claim 2,
wherein the control circuit controls the lateral position of the display object to allow the display object to be visually recognized within a predetermined range in the lateral direction of the vehicle.

4. The display device according to claim 1,
wherein the control circuit further controls a position of the path point in accordance with a travelling speed of the vehicle.

5. The display device according to claim 1,
wherein the control circuit further controls the depth position of the display object visually recognized in accordance with a traveling speed of the vehicle, the depth position being a position in the travel direction of the vehicle.

6. The display device according to claim 5,
wherein the control circuit limits the depth position of the display object to allow the display object to be visually recognized within a predetermined range in an up-down direction of the vehicle.

7. The display device according to claim 1, further comprising:
a first input unit that acquires reliability information indicating reliability of navigation which is determined based on an accuracy of the path set by a navigation device in the vehicle or the accuracy of the current location and the travel direction of the vehicle detected by the navigation device, wherein the control circuit controls either a height of the display object visually recognized from a road surface or a dynamic design of the display object in accordance with the reliability information acquired by the first input unit.

8. The display device according to claim 1,
wherein the control circuit further controls a height of the display object visually recognized from a road surface to be lower as a distance from the current location of the vehicle to the right/left turn point on the path becomes shorter.

9. The display device according to claim 1,
wherein a surface including a width direction of the vehicle, is defined as a first plane,
wherein the attribute of the path point is a tangential direction at the path point on the first plane, and
when determining the mode of inclination of the display object, the control circuit controls the yaw angle of the display object to cause the one direction to coincide with the tangential direction on the first plane.

10. The display device according to claim 1,
wherein the attribute of the path point is a position of the path point, and
when determining the mode of inclination of the display object, the control circuit controls the yaw angle of the display object to cause the one direction coincide with a direction from the vehicle to the path point.

11. The display device according to claim 1,
wherein the control circuit further changes a shape of the display object in accordance with the yaw angle of the display object.

12. The display device according to claim 1,
wherein, when determining the mode of inclination of the display object, the control circuit further controls a pitch angle of the display object in accordance with the yaw angle of the display object.

13. The display device according to claim 1,
wherein the control circuit further controls a color or a brightness of the display object in accordance with the distance from the current location of the vehicle to the right/left turn point located ahead of the path point on the path.

14. The display device according to claim 1,
wherein the control circuit further controls a color or a brightness of the display object in accordance with an expected arrival time from the current location of the vehicle to the right/left turn point located ahead of the path point on the path.

15. The display device according to claim 1,
wherein the control circuit further moves the lateral position of the display object in the lateral direction of the vehicle towards the right/left turn direction indicated by the navigation direction when an expected arrival time from the current location of the vehicle to the right/left turn point on the path is less than or equal to a second threshold value.

16. The display device according to claim 1, further comprising:
a second input unit that acquires sensing information indicating an approach of an other vehicle from a sensor that detects the approach of the other vehicle to the vehicle,
wherein the control circuit further controls a design of the display object in accordance with the sensing information acquired by the second input unit.

* * * * *